United States Patent
Ki et al.

(10) Patent No.: US 11,835,168 B2
(45) Date of Patent: *Dec. 5, 2023

(54) VACUUM ADIABATIC BODY AND REFRIGERATOR

(71) Applicant: LG ELECTRONICS INC., Seoul (KR)

(72) Inventors: Duchan Ki, Seoul (KR); Daewoong Kim, Seoul (KR); Deokhyun Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,791

(22) Filed: Jul. 11, 2022

(65) Prior Publication Data
US 2022/0341535 A1    Oct. 27, 2022

Related U.S. Application Data

(63) Continuation of application No. 16/980,288, filed as application No. PCT/KR2019/007753 on Jun. 26, 2019, now Pat. No. 11,402,052.

(30) Foreign Application Priority Data

Jun. 27, 2018 (KR) .......................... 10-2018-0074202

(51) Int. Cl.
  *F16L 59/065*  (2006.01)
  *F25D 21/04*   (2006.01)
  (Continued)

(52) U.S. Cl.
  CPC ............ *F16L 59/065* (2013.01); *F25D 21/04* (2013.01); *F25D 21/08* (2013.01); *F25D 23/063* (2013.01);
  (Continued)

(58) Field of Classification Search
  CPC ............... F16L 59/065; F25D 2400/40; F25D 2400/02; F25D 21/04; F25D 2201/14;
  (Continued)

(56) References Cited

U.S. PATENT DOCUMENTS 4,884,414 A * 12/1989 Bos ...................... F25D 21/006
                                                            62/155
5,485,397 A *  1/1996 Yamazato ................ H04Q 9/14
                                                            700/286
(Continued)

FOREIGN PATENT DOCUMENTS

CN      1987307 A *  6/2007  ........... F25D 17/045
EP      0 658 716     6/1995
(Continued)

OTHER PUBLICATIONS

International Search Report dated Oct. 14, 2019 issued in Application No. PCT/KR2019/007753.
(Continued)

*Primary Examiner* — Andrew M Roersma
(74) *Attorney, Agent, or Firm* — KED & ASSOCIATES, LLP

(57) ABSTRACT

Provided is a vacuum adiabatic body. The vacuum adiabatic body includes an alternating current line through which AC current flows as a driving source, a direct current line through which direct current flows as a driving source, and a signal line through which a control signal flows as electric lines configured to electrically connect the first space to the second space. Thus, the number of lines passing through the vacuum adiabatic body may be reduced.

18 Claims, 31 Drawing Sheets

(51) Int. Cl.
  *F25D 21/08* (2006.01)
  *F25D 23/06* (2006.01)
  *F25D 29/00* (2006.01)

(52) U.S. Cl.
  CPC ......... *F25D 23/065* (2013.01); *F25D 29/005* (2013.01); *F25D 2201/14* (2013.01); *F25D 2400/02* (2013.01); *F25D 2400/40* (2013.01)

(58) Field of Classification Search
  CPC .... F25D 23/065; F25D 23/063; F25D 29/005; F25D 29/00; F25D 27/00; F25D 27/005
  See application file for complete search history.

(56) References Cited

U.S. PATENT DOCUMENTS

| | | | | |
|---|---|---|---|---|
| 5,682,756 | A * | 11/1997 | Lehmiller | F25D 29/00 62/157 |
| 6,014,325 | A * | 1/2000 | Pecore | F25D 29/00 363/125 |
| 6,485,122 | B2 * | 11/2002 | Wolf | F25D 23/062 220/592.06 |
| 6,557,362 | B1 | 5/2003 | Wilson | |
| 6,725,624 | B2 * | 4/2004 | Hirath | F25D 23/062 52/800.11 |
| 9,459,038 | B1 * | 10/2016 | Read | F25D 21/02 |
| 11,402,052 | B2 * | 8/2022 | Ki | F16L 59/065 |
| 2002/0000092 | A1 * | 1/2002 | Sharood | G06Q 20/105 62/127 |
| 2003/0041612 | A1 * | 3/2003 | Piloni | F25D 23/062 62/277 |
| 2004/0226956 | A1 | 11/2004 | Brooks | |
| 2009/0165478 | A1 | 7/2009 | Devos | |
| 2009/0178427 | A1 | 7/2009 | Eichman | |
| 2011/0030401 | A1 | 2/2011 | Kim | |
| 2011/0219800 | A1 | 9/2011 | Lee | |
| 2011/0264283 | A1 | 10/2011 | Soh et al. | |
| 2012/0104923 | A1 * | 5/2012 | Jung | F25D 23/066 312/406 |
| 2015/0030800 | A1 | 1/2015 | Jung et al. | |
| 2015/0192337 | A1 | 7/2015 | Choi et al. | |
| 2016/0292105 | A1 * | 10/2016 | Imahori | G06F 13/362 |
| 2017/0292776 | A1 * | 10/2017 | Kim | F25D 23/062 |
| 2018/0224195 | A1 | 8/2018 | Jung et al. | |
| 2018/0238610 | A1 | 8/2018 | Jung et al. | |
| 2018/0363973 | A1 * | 12/2018 | Alshourbagy | F25D 23/065 |
| 2019/0101320 | A1 * | 4/2019 | Dherde | F25D 23/028 |
| 2019/0162356 | A1 * | 5/2019 | Allard | F16L 59/065 |
| 2019/0310011 | A1 | 10/2019 | Marinello et al. | |
| 2020/0033049 | A1 * | 1/2020 | Dherde | F25D 23/126 |
| 2021/0372557 | A1 | 12/2021 | Ki et al. | |

FOREIGN PATENT DOCUMENTS

| | | | |
|---|---|---|---|
| EP | 1 338 854 | 8/2003 | |
| JP | H08-261634 | 10/1996 | |
| JP | 2012-087993 | 5/2012 | |
| KR | 10-0343719 | 7/2002 | |
| KR | 10-1143975 | 5/2012 | |
| KR | 10-1316023 | 10/2013 | |
| KR | 10-2015-0012712 | 2/2015 | |
| KR | 10-2017-0016187 | 2/2017 | |
| KR | 10-2019-0070772 | 6/2019 | |
| WO | WO-0231419 A1 * | 4/2002 | ............ F25D 11/022 |
| WO | WO 2006/011112 | 2/2006 | |
| WO | WO 2013/164176 | 11/2013 | |
| WO | WO 2017/023095 | 2/2017 | |
| WO | WO-2017023073 A1 * | 2/2017 | ............ F16L 59/065 |
| WO | WO-2017023097 A1 * | 2/2017 | ............ F16L 59/065 |
| WO | WO 2017/192121 | 11/2017 | |
| WO | WO 2019/108204 | 6/2019 | |

OTHER PUBLICATIONS

Written Opinion dated Oct. 14, 2019 issued in Application No. PCT/KR2019/007753.
United States Office Action dated Nov. 24, 2021 issued in co-pending related U.S. Appl. No. 16/980,288.
Korean Notice of Allowance dated Sep. 20, 2023 issued in Application No. 10-2018-0074202.

* cited by examiner (a)

(b)

(c)

VACUUM ADIABATIC BODY AND REFRIGERATOR

CROSS-REFERENCE TO RELATED APPLICATIONS

This application is a Continuation application of prior U.S. patent application Ser. No. 16/980,288 filed Sep. 11, 2020, which is a U.S. National Stage Application under 35 U.S.C. § 371 of PCT Application No. PCT/KR2019/007753, filed Jun. 26, 2019, which claims priority to Korean Patent Application No. 10-2018-0074202, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body is a product for suppressing heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 mm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Cited Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam. According to the method, additional foaming is not required, and the adiabatic performance of the refrigerator is improved. However, fabrication cost is increased, and a fabrication method is complicated.

As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

As further another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US20040226956A1 (Reference Document 3). However, it is difficult to obtain a practical level of an adiabatic effect by providing a wall of the refrigerator with sufficient vacuum. In detail, there are limitations that it is difficult to prevent a heat transfer phenomenon at a contact portion between an outer case and an inner case having different temperatures, it is difficult to maintain a stable vacuum state, and it is difficult to prevent deformation of a case due to a negative pressure of the vacuum state. Due to these limitations, the technology disclosed in Reference Document 3 is limited to a cryogenic refrigerator, and does not provide a level of technology applicable to general households.

Alternatively, the present applicant has applied for Korean Patent Publication No. 10-2017-0016187 (Cited Document 4) that discloses a vacuum adiabatic body and a refrigerator. The present technology proposes a refrigerator in which both a main body and a door are provided with a vacuum adiabatic body.

In a case of manufacturing a refrigerator, a control line for controlling various components such as a sensor and a driving unit for operating the refrigerator connects the inside and outside of the refrigerator to each other. For this, in the refrigerator manufactured according to the related art, an electric line may be disposed in a foam wall. Since the foam wall completely fills a space between the electric lines, the refrigerator may operate without deteriorating adiabatic efficiency.

However, when the refrigerator is manufactured using the vacuum adiabatic body like Cited Document 4, it is difficult to place the electric lines inside the vacuum adiabatic body because of the difficulty in maintaining and manufacturing the vacuum performance. When the electric lines are installed to pass through the vacuum adiabatic body, the adiabatic performance of the vacuum adiabatic body may be affected, and thus, it is not preferable. Since the number of lines connected to the inside and outside of the refrigerator is about 40 for the operation of the refrigerator, the increase in number of through-parts of the vacuum adiabatic body or the increase in size of each of the through-parts increases deterioration of the adiabatic efficiency. Furthermore, since the number of lines increases more and more due to the refinement of the size of the refrigerator, there is a great difficulty in installing the electric lines connecting the inside and outside of the refrigerator to which the vacuum adiabatic body is applied.

The inventor of the present invention has found that there is Korean Patent Registration No. 10-1316023 (Cited Document 5), titled line combination module and line structure using the same, which disclosures a feature in which the inside and outside of the refrigerator are connected to each other through power line communication, through the conduction of the repeated research. According to Cited Document 5, an AC power line communication method is used to supply alternating current by using two electric lines to various loads placed in the refrigerator and perform the power line communication using the two electric lines. As a result, only the two electric lines may pass through the foam wall.

According to Cited Document 5, the number of electric lines passing through a wall of the refrigerator may be reduced to two.

Despite this advantage, the technology disclosed in Cited Document 5 is difficult to apply to the refrigerator due to the following limitations. First, there is a limitation that a rectifying device accompanied with a switching operation has to be provided in the inside of the refrigerator to perform DC driving of the load, and the energy consumption efficiency of the refrigerator is significantly lowered due to the heat of the rectifying device. Second, to perform the power line communication, a high-frequency filter and an A/D converter for receiving power line signals are required for each of individual loads in the refrigerator, and a D/A inverter for transmitting power line signals is required, and thus, a large amount of energy is lost. Third, there is a limitation that high-frequency components used in communication are likely to be lost due to a difference in level between a low-frequency and a high-frequency when the power line communication is performed. Fourth, since a microcomputer of the door, a main body substrate, and individual microcomputers having a large load carry out transmission and reception individually by using two AC lines, it takes a lot of time to write program, and there is a great fear of interference between signals transmitted and received between the nodes. Fifth, there is a limitation that repairing is impossible at all if the substrate and the parts are placed inside the foam wall.

Embodiments provide a vacuum adiabatic body, in which the number of electric lines connecting the inside and outside of the vacuum adiabatic body to each other to air-condition an internal space is minimized and, and a refrigerator.

Embodiments also provide a vacuum adiabatic body, in which a generation amount of heat within a refrigerator is minimized, and power consumption for transmitting and receiving signals is minimized, and a refrigerator.

Embodiments also provide a vacuum adiabatic body in which an error does not occur in transmitting and receiving signals between a controller and a load, and a refrigerator.

In one embodiment, a vacuum adiabatic body includes: an alternating current line through which AC current flows as a driving source; a direct current line through which direct current flows as a driving source; and a signal line through which a control signal flows as electric lines configured to electrically connect the first space to the second space. Thus, the number of lines passing through the vacuum adiabatic body may be reduced.

In another embodiment, a refrigerator includes a connection line configured to connect to the first controller to the second controller, wherein the connection line includes: a first connection line disposed in the first space; a second connection line disposed in the second space; and a third connection line disposed to pass through a third space and the door so as to connect the first space to the second space without directly passing through the third space. According to the embodiment, the total number and size of electric lines passing through the vacuum adiabatic body may be significantly reduced while sufficiently performing a control of the refrigerator.

In further another embodiment, a refrigerator includes: a main body configured to provide an internal space in which storage goods are stored; a door opened so that an external space selectively communicates with the internal space; a heat generation part disposed in the internal space;

a power control part disposed in the external space; and six lines configured to connect the external space to the internal space so as to supply power. The minimum number of lines may pass through the vacuum adiabatic body so that the refrigerator stably operates, and adiabatic reliability of the vacuum adiabatic body is secured.

A heat resistance unit that resists heat transfer between the plate members providing an outer wall of the vacuum adiabatic body may include a conductive resistance sheet that resists conduction of heat transferred along a wall of the vacuum space part and may further include a side frame coupled to the conductive resistance sheet.

Also, the heat resistance unit may include at least one radiation resistance sheet that is provided in a plate shape within the vacuum space part or may include a porous material that resists radiation heat transfer between the second plate member and the first plate member within the vacuum space part.

According to the embodiments, the number of electric lines connecting the inside and outside of the vacuum insulator may be optimized so that stable driving of the refrigerator is obtained while reducing the size of the through-part and the number of through-parts of the vacuum adiabatic body.

According to the embodiments, the separate heat generation source in the space within the refrigerator may be removed to improve the energy efficiency of the refrigerator.

According to the embodiments, the stability of the transmission and reception of the signals between the controller and the load may be secured to prevent the refrigerator from being broken down.

According to the embodiments, since the commercial load driven by the direct current is applied to the refrigerator to which the vacuum adiabatic body is applied as it is, the manufacturing cost of the refrigerator to which the vacuum adiabatic body is applied may be reduced.

BRIEF DESCRIPTION OF DRAWINGS

FIGS. 13 and 14 are partial cutaway perspective views of an inner surface part, wherein FIG. 13 illustrates in a state in which coupling is completed, and FIG. 14 illustrates a coupling process.

FIGS. 16 and 17 are views illustrating one end portion of the sealing frame, wherein FIG. 16 illustrates a state before a door hinge is installed, and FIG. 17 illustrates a state in which the door hinge is installed.

FIG. 18 is a view for explaining an effect of the sealing frame according to an embodiment in comparison with the technique according to the related art, wherein FIG. 18(a) is a cross-sectional view of a contact part of a main body-side vacuum adiabatic body and a door according to an embodiment, and FIG. 18(b) is a cross-sectional view of a main body and a door according to the related art.

FIGS. 26 and 27 are cross-sectional views of an edge portion of the vacuum adiabatic body in a state in which a lamp is installed, wherein FIG. 26 is a cross-sectional view of a portion through which an electric line of the lamp does not pass, and FIG. 27 is a cross-sectional view of a portion through the electric line of the lamp pass.

FIGS. 38 to 40 are views for comparing and explaining a configuration of control of the refrigerator, wherein FIG. 38 is a view of a case in which a plurality of lines, e.g., about 40 lines are inserted into the refrigerator in the main controller according to the related art, FIG. 39 is a view of a case in which six lines pass through the pipeline, and FIG. 40 is a view of a case in which the six lines pass through a gap part between the sealing frame and an outer surface of the main body.

DETAILED DESCRIPTION

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

Hereinafter, for description of embodiments, the drawings shown below may be displayed differently from the actual product, or exaggerated or simple or detailed parts may be deleted, but this is intended to facilitate understanding of the technical idea of the present invention. It should not be construed as limited. However, it will try to show the actual shape as much as possible.

The following embodiments may be applied to the description of another embodiment unless the other embodiment does not collide with each other, and some configurations of any one of the embodiments may be modified in a state in which only a specific portion is modified in another configuration may be applied.

In the following description, the vacuum pressure means any pressure state lower than the atmospheric pressure. In addition, the expression that a vacuum degree of A is higher than that of B means that a vacuum pressure of A is lower than that of B.

Figure 1:
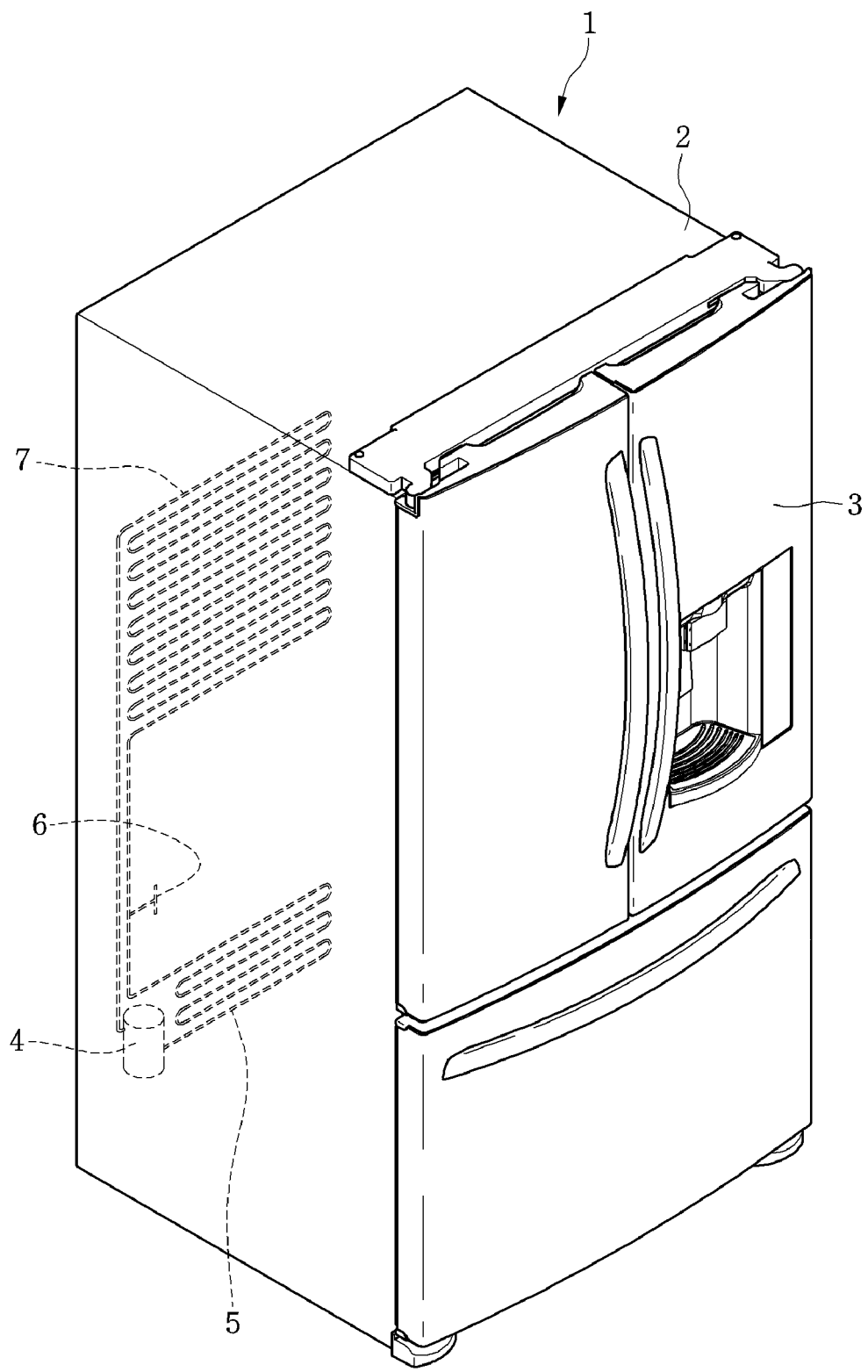
FIG. 1 is a perspective view of a refrigerator according to an embodiment.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or slidably movably disposed to open/close the cavity 9. The cavity 9 may provide at least one of a refrigerating compartment and a freezing compartment.

Parts constituting a freezing cycle in which cold air is supplied into the cavity 9. In detail, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

Figure 2:
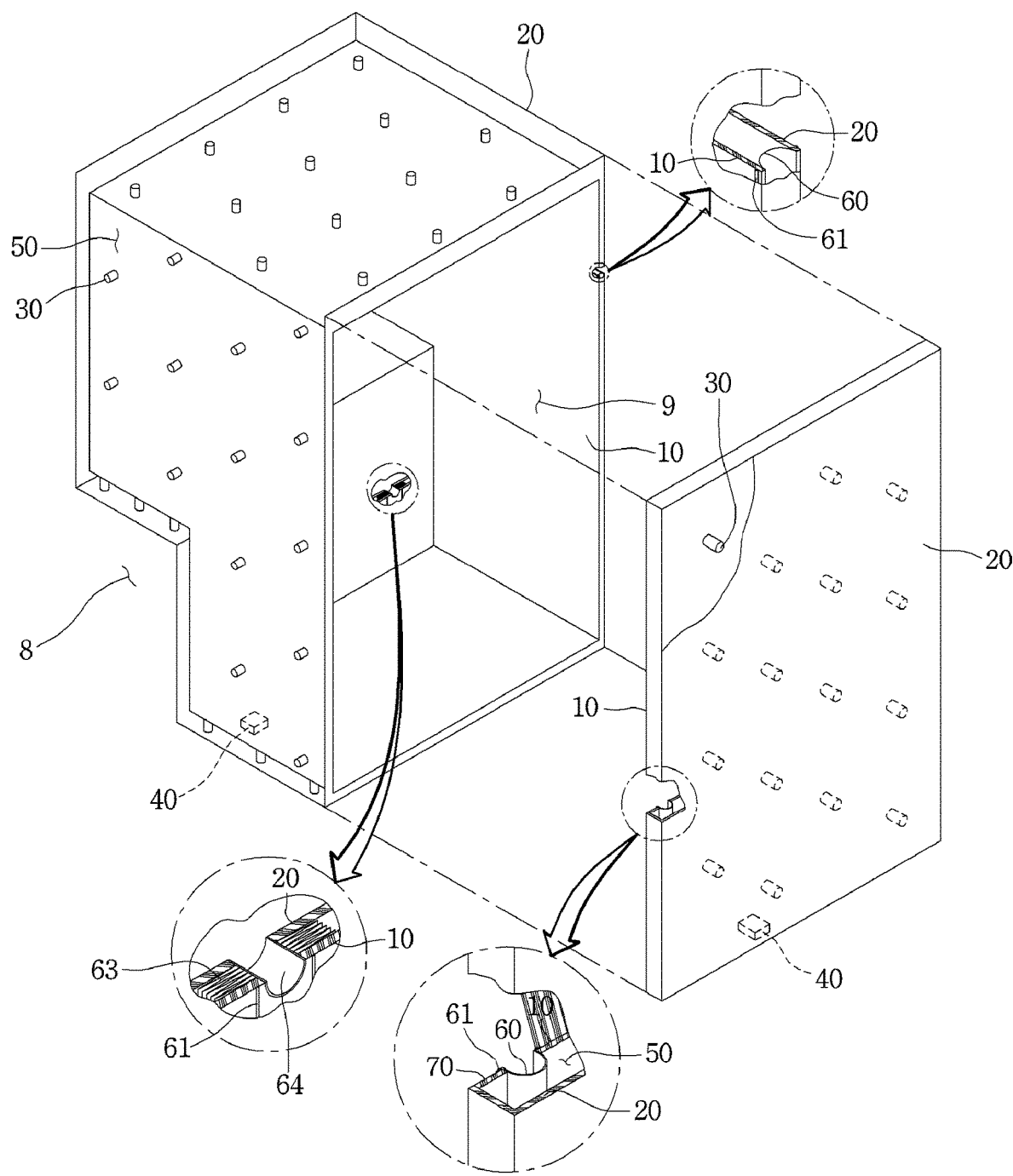
FIG. 2 is a view schematically showing a vacuum adiabatic body used in a main body and a door of the refrigerator.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, a vacuum space part 50 defined as an interval part between the first and second plate members 10 and 20. Also, the vacuum adiabatic body includes the conductive resistance sheets 60 and 63 for preventing thermal conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine room 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet that resists conduction of heat transferred along a wall of a third space and may further include a side frame coupled to the conductive resistance sheet. The conductive resistance sheet and the side frame will be clarified by the following description.

Also, the heat resistance unit may include at least one radiation resistance sheet that is provided in a plate shape within the third space or may include a porous material that resists radiation heat transfer between the second plate member and the first plate member within the third space. The radiation resistance sheet and the porous material will be clarified by the following description.

Figure 3:
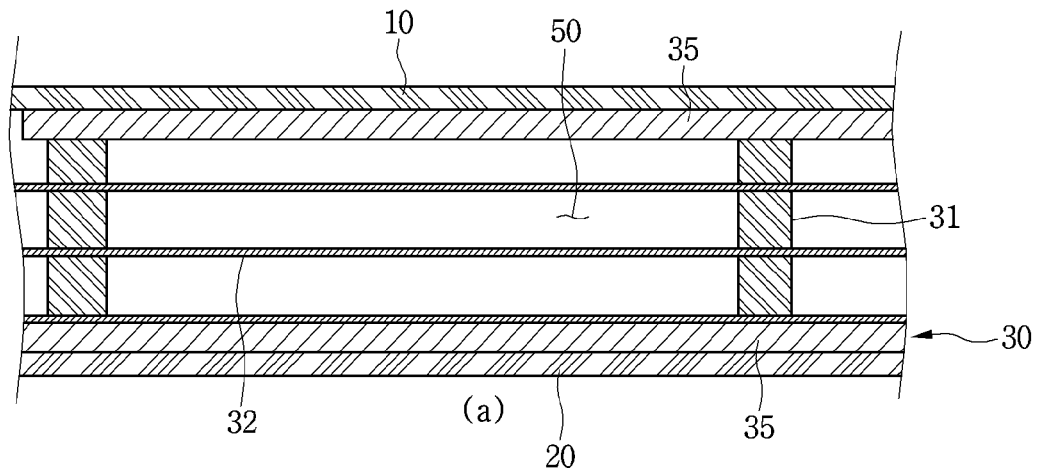
FIG. 3 is a view illustrating various embodiments of an internal configuration of a vacuum space part.
Figure 3:
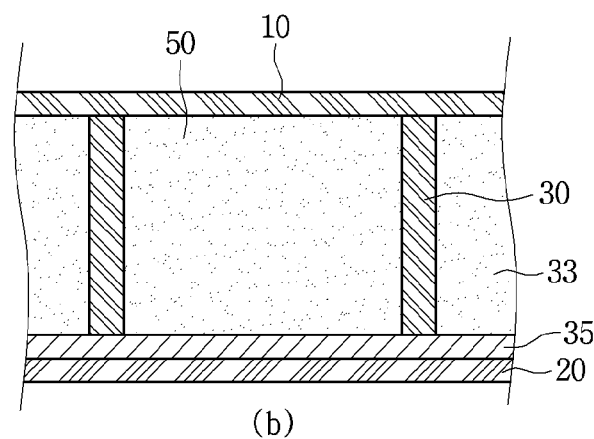
Figure 3:
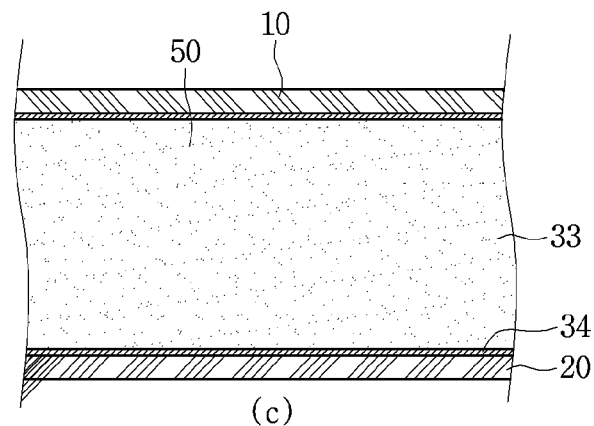

FIG. 3 is a view illustrating various embodiments of an internal configuration of the vacuum space part.

First referring to FIG. 3A, the vacuum space part 50 may be provided in a third space having a pressure different from that of each of the first and second spaces, preferably, a vacuum state, thereby reducing an adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of thermal conduction, caused by contact between the plate members 10 and 20.

The supporting unit 30 may be provided to reduce deformation of the vacuum space part 50. The supporting unit 30 includes a bar 31. The bar 31 may extend in a substantially vertical direction with respect to the plate members to support a distance between the first plate member and the second plate member. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

The supporting unit 30 may be made of a resin selected from PC, glass fiber PC, low outgassing PC, PPS, and LCP to obtain high compressive strength, a low outgassing and water absorption rate, low thermal conductivity, high compressive strength at a high temperature, and superior processability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet, at least two radiation resistance sheets 32 may be provided at a certain distance so as not to contact each other. Also, at least one radiation resistance sheet may be provided in a state in which it contacts the inner surface of the first or second plate member 10 or 20.

Referring to FIG. 3B, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Referring to FIG. 3C, the supporting unit 30 for maintaining the vacuum space part 50 may not be provided. A porous material 333 may be provided to be surrounded by a film 34 instead of the supporting unit 30. Here, the porous material 33 may be provided in a state of being compressed so that the interval of the vacuum space part is maintained. The film 34 made of, for example, a PE material may be provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 4:
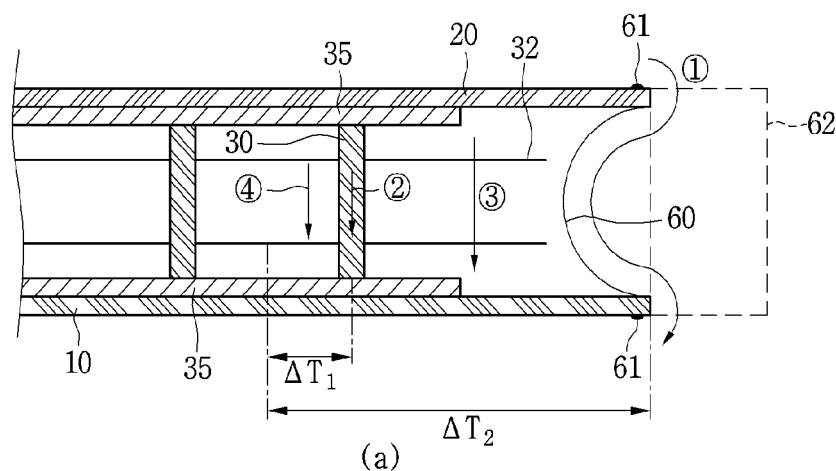
FIG. 4 is a view illustrating various embodiments of conductive resistance sheets and peripheral portions thereof.
Figure 4:
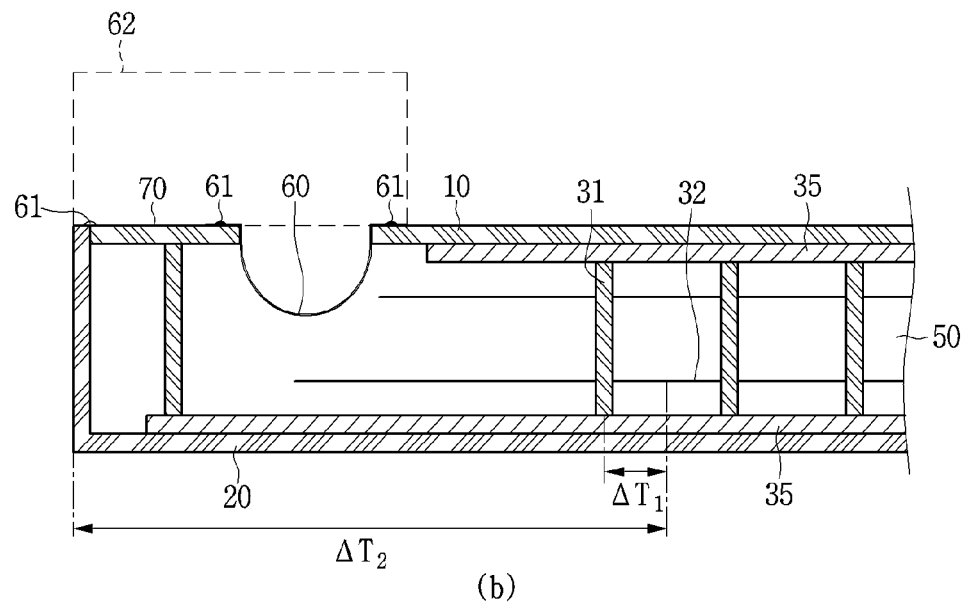
Figure 4:
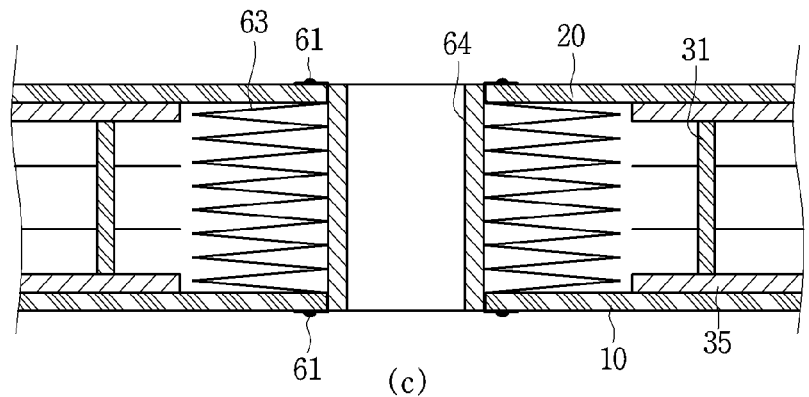

FIG. 4 is a view illustrating various embodiments of conductive resistance sheets and peripheral parts thereof. Structures of the conductive resistance sheets are briefly illustrated in FIG. 2, but will be understood in detail with reference to the drawings.

First, a conductive resistance sheet proposed in FIG. 4(*a*) may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent thermal conduction between two different kinds of plate members.

The conductive resistance sheet 60 may be provided with the sealing part 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a thermal conduction distance of the conductive resistance sheet 60 is provided longer than the linear distance of each plate member, so that the amount of thermal conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, thermal conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4(*b*) may be preferably applied to the door-side vacuum adiabatic body. In FIG. 4(*b*), portions different from those of FIG. 4(*a*) are described in detail, and the same description is applied to portions identical to those of FIG. 4(*a*). A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part, i.e., an edge side portion of the vacuum space part. This is because, unlike the main body, a corner edge portion of the door is exposed to the exterior. In more detail, if the conductive resistance sheet 60 is placed at the front end portion of the vacuum space part, the corner edge portion of the door is exposed to the exterior, and hence there is a disadvantage in that a separate adiabatic part should be configured so as to thermally insulate the conductive resistance sheet 60.

A conductive resistance sheet proposed in FIG. 4(*c*) may be preferably installed in the pipeline passing through the vacuum space part. In FIG. 4(*c*), portions different from those of FIGS. 4(*a*) and 4(*b*) are described in detail, and the same description is applied to portions identical to those of FIGS. 4(*a*) and 4(*b*). A conductive resistance sheet having the same shape as that of FIG. 4(*a*), preferably, a wrinkled conductive resistance sheet 63 may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 4(*a*). Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 may endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK\text{solid conduction heat} > eK\text{radiation transfer heat} > eK\text{gas conduction heat} \quad [\text{Equation 1}]$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body may be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and may be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and may endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. Lastly, the conductive resistance sheet may be preferably made of a material that is easily deformed by the vacuum pressure and has the lowest stiffness.

Even when the porous material 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist to heat transfer by only the supporting unit 30. Here, a porous material 33 may be filled with the supporting unit inside the vacuum space part 50 to resist to the heat transfer. The heat transfer to the porous material may resist without applying the supporting unit.

The case where only the supporting unit is applied will be described.

Figure 5:
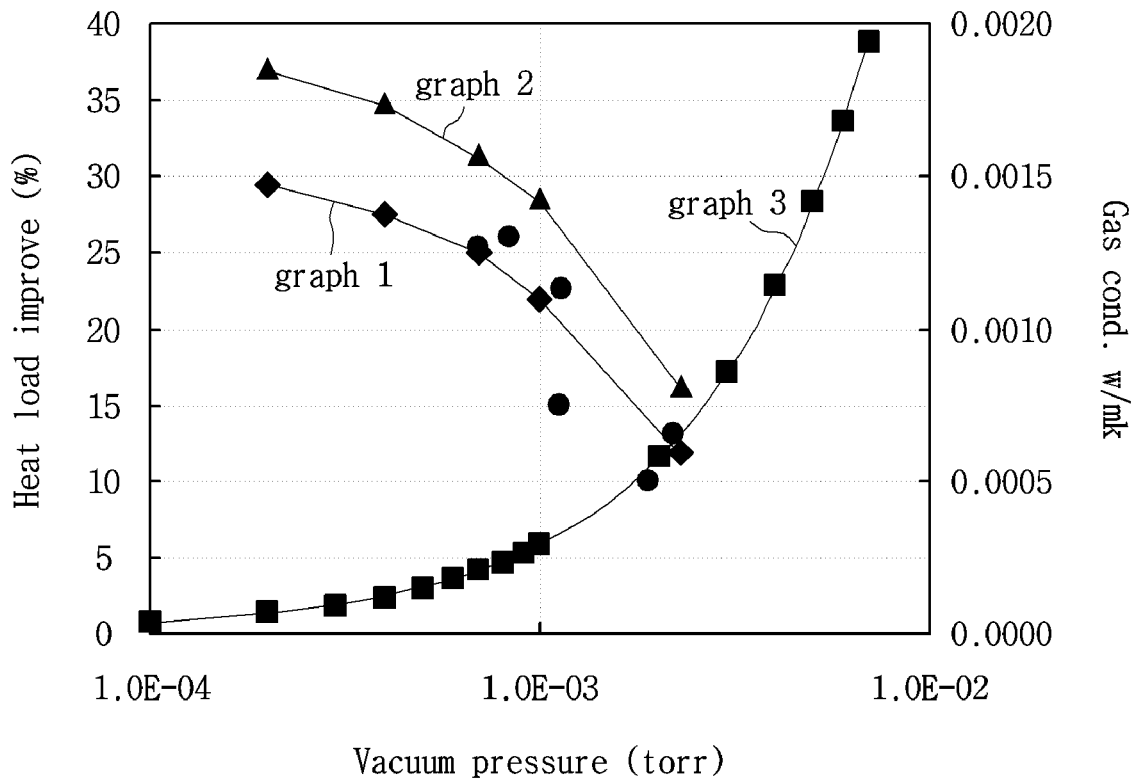
FIG. 5 is a graph illustrating a variation in adiabatic performance and a variation in gas conductivity according to a vacuum pressure by applying a simulation.

FIG. 5 illustrates graphs showing changes in adiabatic performance and changes in gas conductivity with respect to vacuum pressures by applying a simulation.

Referring to FIG. 5, it may be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it may be seen that the degree of improvement of the adiabatic performance is gradually lowered. Also, it may be seen that, as the vacuum pressure is decreased, the gas conductivity (Graph 3) is decreased. However, it may be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

Figure 6:
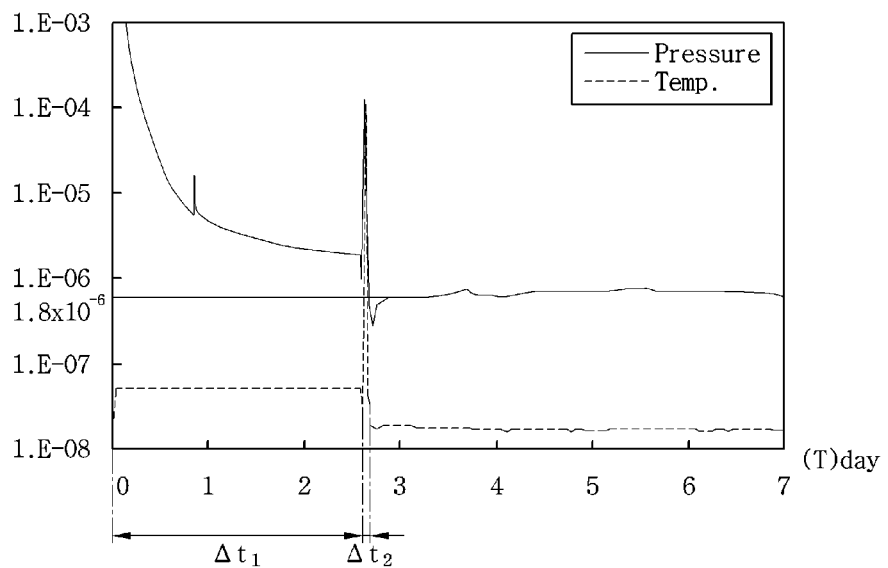
FIG. 6 is a graph illustrating results obtained by observing a time and a pressure in a process of exhausting the inside of the vacuum adiabatic body when a supporting unit is used.

FIG. 6 is a graph illustrating results obtained by observing a time and a pressure in a process of exhausting the inside of the vacuum adiabatic body when a supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta T1$). After that, the getter is activated by disconnecting the vacuum space part 50 from the vacuum pump and applying heat to the vacuum space part 50 ($\Delta T2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10\text{-}6$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10\text{-}6$ Torr.

Figure 7:
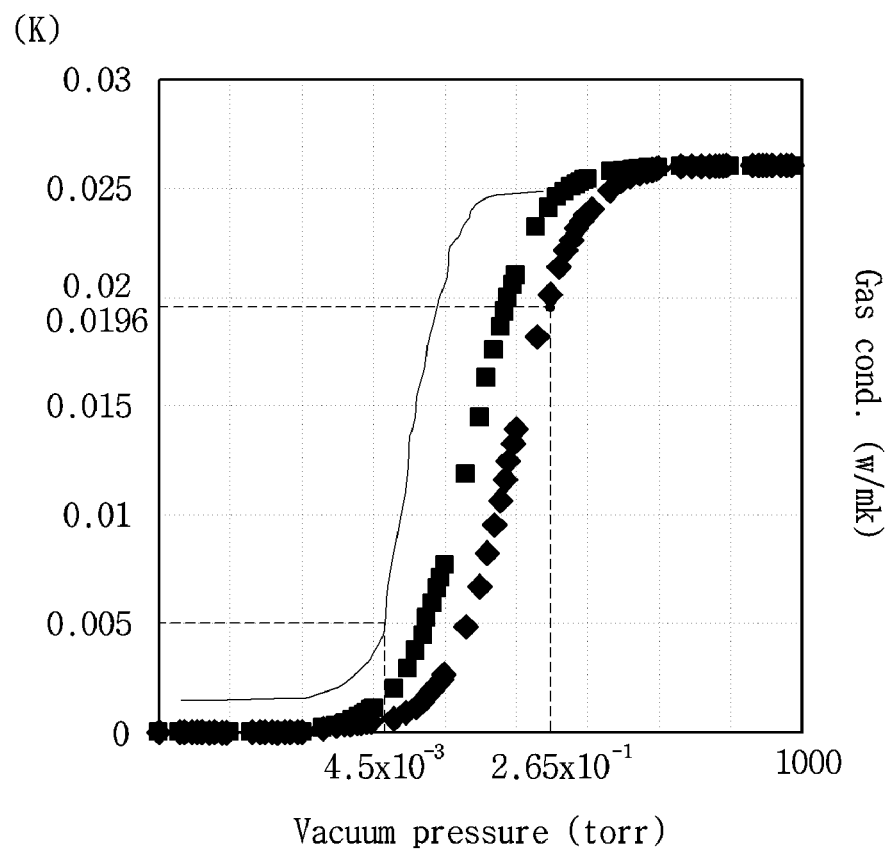
FIG. 7 is a graph illustrating results obtained by comparing a vacuum pressure with gas conductivity.

FIG. 7 is a graph obtained by comparing a vacuum pressure with gas conductivity.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It was seen that, since the size of the gap is small at a point corresponding to a typical effective heat transfer coefficient of 0.0196 W/mK, which is provided to a adiabatic material formed by foaming polyurethane, the vacuum pressure is $2.65 \times 10\text{-}1$ Torr even when the size of the gap is 2.76 mm. Meanwhile, it was seen that the point at which reduction in adiabatic effect caused by gas conduction heat is saturated even though the vacuum pressure is decreased is a point at which the vacuum pressure is approximately $4.5 \times 10\text{-}3$ Torr. The vacuum pressure of $4.5 \times 10\text{-}3$ Torr may be defined as the point at which the reduction in adiabatic effect caused by gas conduction heat is saturated. Also, when the effective heat transfer coefficient is 0.1 W/mK, the vacuum pressure is $1.2 \times 10\text{-}2$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10\text{-}4$ Torr. Also, the vacuum pressure at the point at which the reduction in adiabatic effect caused by gas conduction heat is saturated is approximately $4.7 \times 10\text{-}2$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is middle between the vacuum pressure when only the supporting unit is used and the vacuum pressure when only the porous material is used. When only the porous material is used, the lowest vacuum pressure may be used.

Figure 8:
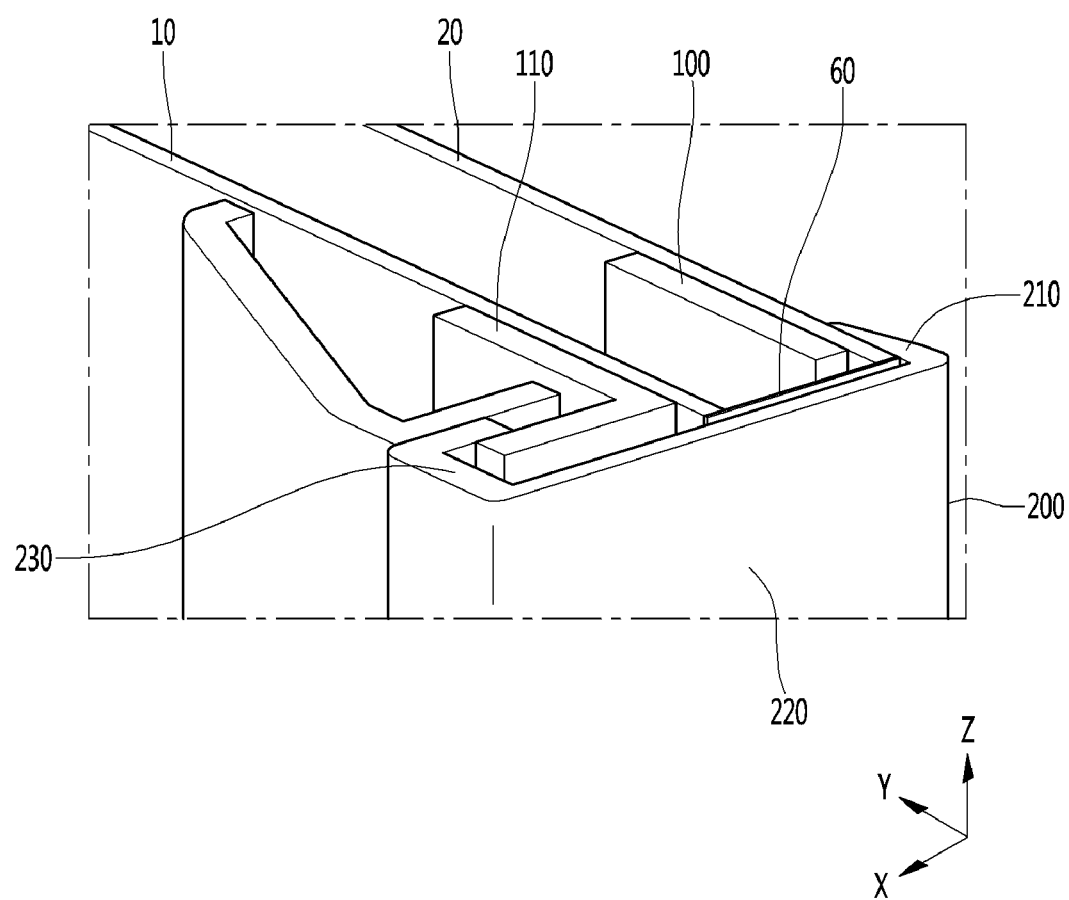
FIG. 8 is a cross-sectional perspective view of an edge of the vacuum adiabatic body.

FIG. 8 is a cross-sectional perspective view of an edge of the vacuum adiabatic body.

Referring to FIG. 8, a first plate member 10, a second plate member 20, and a conductive resistance sheet 60 are provided. The conductive resistance sheet 60 may be provided as a thin plate to resist to thermal conduction between the plate members 10 and 20. Although the conductive resistance sheet 60 is provided as a flat plan shape as a thin plate, the conductive resistance sheet 60 may have a curved shape by being pulled inward when vacuum is applied to the vacuum space part 50.

Since the conductive resistance sheet 60 has the thin plate shape and low strength, the conductive resistance sheet 60 may be damaged by even an external small impact. As a result, when the conductive resistance sheet 60 is damaged, the vacuum of the vacuum space part may be broken, and thus, performance of the vacuum adiabatic body may not be properly exerted. To solve this limitation, a sealing frame 200 may be disposed on an outer surface of the conductive resistance sheet 60. According to the sealing frame 200, components of the door 3 or other components may not directly contact the conductive resistance sheet 60 but indirectly contact the conductive resistance sheet 60 through the sealing frame 200 to prevent the conductive resistance sheet 60 from being damaged. To allow the sealing frame 200 to prevent an impact from being applied to the conductive resistance sheet 60, the two members may be spaced apart from each other, and a buffer member may be interposed between the two members.

To reinforce the strength of the vacuum adiabatic body, a reinforcement member may be provided on each of the plate members 10 and 20. For example, the reinforcement member may include a first reinforcement member 100 coupled to an edge portion of the second plate member 10 and a second reinforcement member 110 coupled to an edge portion of the first plate member 10. To improve the strength of the vacuum adiabatic body, a member having a thickness and strength greater than those of the plate member 10 may be applied to the reinforcement members 100 and 110. The first reinforcement member 100 may be provided in an internal space of the vacuum space part 50, and the second reinforcement member 110 may be provided on an inner surface part of the main body 2.

The conductive resistance sheet 60 may not contact the reinforcement members 100 and 110. This is done because thermal conductive resistance characteristics generated in the conductive resistance sheet 60 is destroyed by the reinforcement members. That is to say, a width of a narrow heat bridge (heat bridge) that resists to the thermal conduction is greatly expanded by the reinforcement member, and the narrow heat bridge characteristics are destroyed.

Since the width of the internal space of the vacuum space part 50 is narrow, the first reinforcement member 100 may be provided in a flat plate shape in cross-section. The second reinforcement member 110 provided on the inner surface of the main body 2 may be provided in a shape of which a cross-section is bent.

The sealing frame 200 may include an inner surface part 230 disposed in the internal space of the main body 2 and supported by the first plate member 10, an outer surface part 210 disposed in the external space of the main body 2 and supported by the second plate member 20, and a side surface part 220 disposed on a side surface of the edge of the vacuum adiabatic body constituting the main body 2 to cover the conductive resistance sheet 60 and connect the inner surface part 230 to the outer surface part 210.

The sealing frame 200 may be made of a resin material that is slightly deformable. A mounted position of the sealing frame 200 may be maintained by an interaction between the inner surface part 230 and the outer surface part 210, i.e., by a holding action. That is to say, the set position may not be separated.

The position fixing of the sealing frame 200 will be described in detail.

First, movement of the sealing frame 200 in the extending direction (a y-axis direction in FIG. 8) on the plane of the plate members 10 and 20 may be fixed by being supported by the inner surface part 230 by being hooked on the second reinforcement member 110. In more detail, the sealing frame 200 may move out of the vacuum adiabatic body by interfering with the inner surface part 230 of the second reinforcement member 110. On the other hand, the movement of the sealing frame 200 to the inside of the vacuum adiabatic body may be interrupted by at least one action of first action in which the inner surface part 230 is hooked to be supported by the second reinforcement member 110 (this action may act in both directions in addition to elastic restoring force of the sealing frame made of a resin), second action in which the side surface part 220 is stopped with respect to the plate member 10, and third action in which the inner surface part 230 prevents the first plate member 10 from moving in the y-axis direction.

The movement of the sealing frame 200 in the vertical extension direction (an x-axis direction in FIG. 8) with respect to the cross-section of the plate members 10 and 20 may be fixed by hooking and supporting the outer surface part 210 to the second plate member 20. In the auxiliary action, the movement of the sealing frame 200 in the x-axis direction may be interrupted by the action of hooking the second reinforcement member 110 and the folding action.

The movement of the sealing frame 200 in the extension direction (a z-axis direction in FIG. 8) may be stopped by at least one of first action in which the inner surface part 230 of one sealing frame 200 contacts the inner surface of the other sealing frame 200 and second action in which the inner surface part 230 of one sealing frame 200 contacts a mullion 300.

Figure 9:
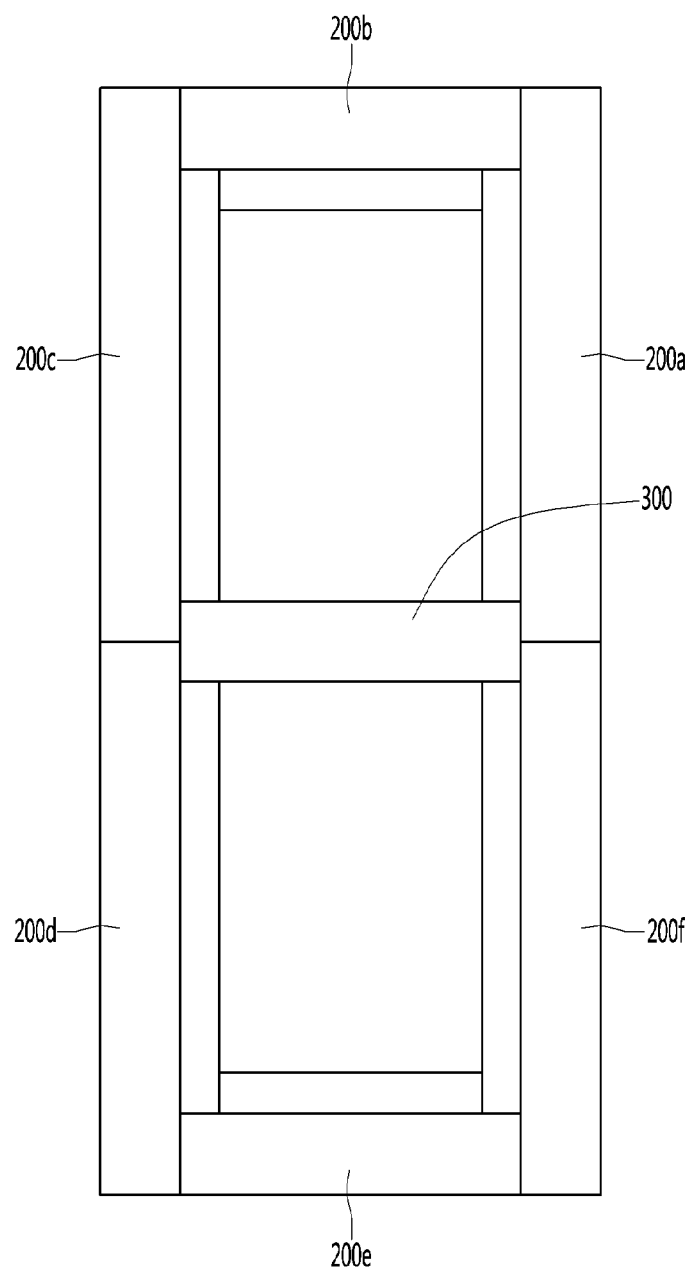
FIGS. 9 and 10 are schematic front views of a main body in a virtual state in which an inner surface part is spread.
Figure 10:
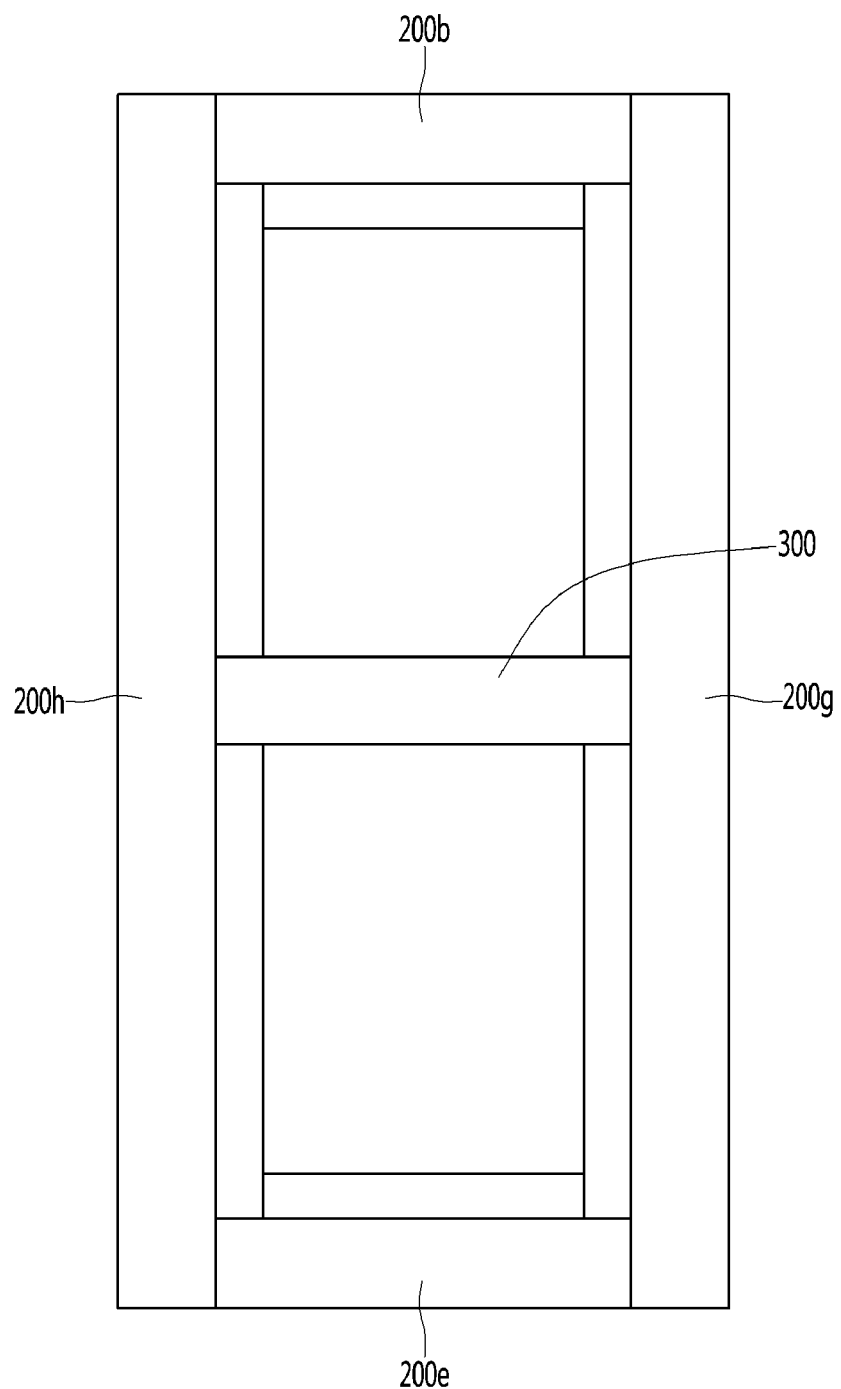

FIGS. 9 and 10 are schematic views of the main body when viewed from the front side. In the drawings, it should be noted that the sealing frame 200 shows a virtual state in which the inner surface part 230 is spread in a direction parallel to the side surface part 220.

Referring to FIGS. 9 and 10, the sealing frame 200 may include members 200b and 200e that respectively seal upper and lower edges of the main body 2. The side edge of the main body 2 may be divided according to whether the spaces within the refrigerator, which are divided on the basis of the mullion 300, are separately (in FIG. 9) or integrally (in FIG. 10) sealed.

When the side edge of the main body 2 is separated as shown in FIG. 9, it may be divided into four sealing frames 200a, 200c, 200d and 200f. When the side edge of the main body 2 is integrally sealed as shown in FIG. 10, it may be divided into two sealing frames 200g and 200c.

When the side edge of the main body 2 is sealed with the two sealing frames 200g and 200c as shown in FIG. 10, since two coupling operations may be required, the manufacturing may be facilitated. However, it is necessary to cope with such a limitation because there is a risk of a loss of cold air.

In the case of sealing the side edge of the main body 2 with the four sealing frames 200*a*, 200*c*, 200*d* and 200*f* as shown in FIG. 9, four coupling operations may be required, and thus, the manufacturing may be inconvenient. However, the thermal conduction may be interrupted to reduce the heat transfer between the separated storage rooms, thereby reducing the loss of the cold air.

The embodiment of the vacuum adiabatic body shown in FIG. 8 may be preferably exemplify the vacuum adiabatic body on the main body. However, it does not exclude that it is provided to the door-side vacuum adiabatic body. Since a gasket is installed on the door 3, the sealing frame 200 may be disposed on the main body-side vacuum adiabatic body. In this case, the side surface part 220 of the sealing frame 200 may further have the advantage that the gasket provides a sufficient width for the contact.

In more detail, since the width of the side surface part 220 is wider than the adiabatic thickness of the vacuum adiabatic body, that is, the width of the vacuum adiabatic body, an adiabatic width of the gasket may be provided at a sufficiently wide width. For example, when the adiabatic thickness of the vacuum adiabatic body is about 10 mm, there is an advantage that the storage space of the refrigerator is enlarged by providing a large storage space in the cavity. However, there is a problem that the gap of about 10 mm does not provide a sufficient gap for the contact of the gasket. In this case, since the side surface part 220 provides a wide gap corresponding to the contact area of the gasket, it is possible to effectively prevent the cold air from being lost through the contact interval between the main body 2 and the door 3. That is, when the contact width of the gasket is about 20 mm, even though the width of the side surface part 220 may be about 20 mm or more, the side surface part 220 may have a width about 20 mm or more to corresponding to the contact width of the gasket.

It may be understood that the sealing frame 200 performs the shielding of the conductive resistance sheet and the sealing function to prevent the cold air from being lost.

Figure 11:
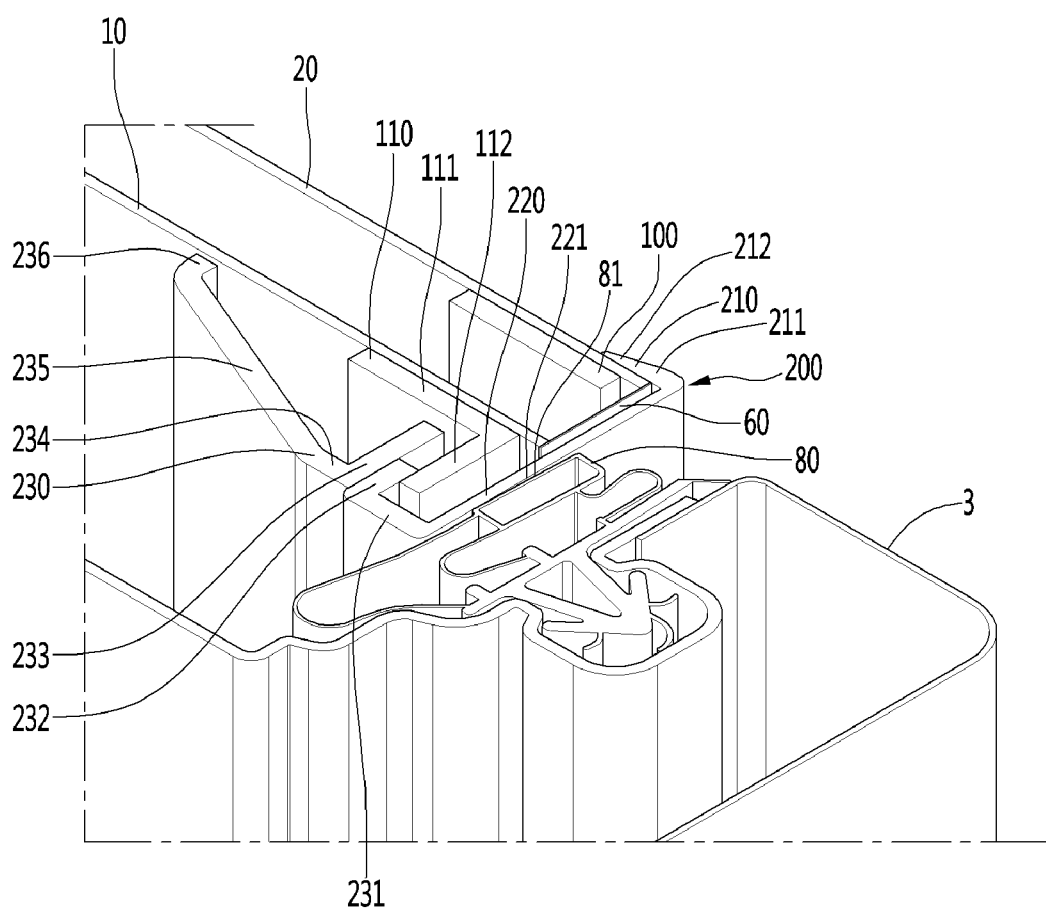
FIG. 11 is a cross-sectional view of a contact part in a state in which the main body is closed by the door.

FIG. 11 is a cross-sectional view of a contact part in a state in which the main body is closed by the door.

Referring to FIG. 11, the gasket 80 is disposed between the main body 2 and the door 3. The gasket 80 may be coupled to the door 3 and provided as a member that is made of a soft deformable material. The gasket 80 includes a magnet as one component. When the magnet approaches by pulling a magnetic body (i.e., a magnetic body of an edge portion of the main body), a contact surface between the main body 2 and the door 3 may be blocked by the sealing surface having a predetermined width due to the smooth deformation of the gasket 80.

In detail, when a gasket sealing surface 81 of the gasket contacts the side surface part 220, a sealing surface 221 of the side surface part having a sufficient width may be provided. The sealing surface 221 of the side surface part may be defined as a contact surface on the side surface part 220 which is in contact with the gasket sealing surface 81 when the gasket 80 contacts the side surface part 220.

Thus, it is possible to secure the sealing surfaces 81 and 221 having a sufficient area irrespective of the adiabatic thickness of the vacuum adiabatic body. This is because even if the adiabatic thickness of the vacuum adiabatic body is narrow, and the adiabatic thickness of the vacuum adiabatic body is narrower than the gasket sealing surface 81, if the width of the side surface part 220 increases, the sealing surface 221 of the side surface part having the sufficient width may be obtained. In addition, the sealing surfaces 81 and 221 having the sufficient area may be ensured irrespective of the deformation of the member, which may affect the deformation of the contact surface between the main body and the door. This is because it is possible to provide a predetermined clearance in and out of the side surface sealing surface 221 in designing the side surface part 220 so that even if the slight deformation occurs between the sealing surfaces 81 and 221, the width and area may be maintained.

In the sealing frame 200, the outer surface part 210, the side surface part 220, and the inner surface part 230 may be provided, and their set positions may be maintained. Briefly, the outer surface part 210 and the inner surface part 230 may be provided in a shape, i.e., a recessed groove shape that is capable of holding end portion of the vacuum adiabatic body, more particularly, the plate members 10 and 20. Here, it may be understood that the recessed groove has a configuration of a recessed groove as a constitution in which a width between the end portions of the outer surface part 210 and the inner surface part 230 is less than the width of the side surface part 220.

The coupling of the sealing frame 200 will be briefly described. First, the side surface part 220 and the outer surface part 210 rotate in the direction of the second plate member 20 in a state in which the inner surface part 230 is hooked with the second reinforcement member 110. Thus, the sealing frame 200 is elastically deformed, and the outer surface part 210 may move inward along the outer surface of the second plate member 20 to complete the coupling. When the coupling of the sealing frame is completed, the sealing frame may return to its original shape before being deformed. When the coupling is completed, the installation position may be maintained as described above.

Detailed configuration and operation of the sealing frame 200 will be described.

The outer surface part 210 is provided with an extension part 211 that extends to the outside of the refrigerator (hereinafter, referred to as an outward extension part), which extends inward from an end of the second plate member 20 and a contact part 212 outside the refrigerator (hereinafter, referred to as an outside contact part), which contacts the outer surface of the second plate member 20 at an end of the outside extension part 211.

The outward extension part 211 may have a predetermined length to prevent the outer surface part 210 from being separated by external weak force. That is to say, even though the outer surface part 210 is forced to be pulled toward the door due to carelessness of the user, the outer surface part 210 may not be completely separated from the second plate member 20. However, if it is excessively long, there is difficulty in intentional removal at the time of repair, and it is preferable that the length is limited to a predetermined length because the coupling operation becomes difficult.

The outside contact portion 212 may be provided with a structure in which an end of the outside extension part 211 is slightly bent toward the outer surface of the second plate member 20. Thus, the sealing due to the contact between the outer surface part 210 and the second plate member 20 may be completed to prevent foreign substances from being introduced.

The side surface part 220 is bent at an angle of about 90 degrees from the outer surface part 210 toward the opening of the main body 2 and is provided with a width enough to secure the sufficient width of the side surface sealing surface 221. The side surface part 220 may be provided thinner than the inner surface part 210 and the outer surface part 230. This is for the purpose of permitting the elastic deformation at the time of coupling or removing the sealing frame 200 and the purpose of not permitting a distance to cause magnetic force between the magnet disposed on the gasket 80 and the magnetic body on the side of the body so that the magnetic force is weakened. The side surface part 220 may have a purpose of protecting the conductive resistance sheet 60 and arranging an outer appearance as an exposed portion of the outside. When the adiabatic member is provided inside the side surface part 220, the adiabatic performance of the conductive resistance sheet 60 may be reinforced.

The inner surface part 230 extends from the side surface part 220 in the direction of the inside of the refrigerator, that is, in the rear surface direction of the main body, at about 90 degrees. The inner surface part 230 may perform an action for fixing the sealing frame 200, an operation for installing components that is necessary for operation of a product to which the vacuum adiabatic body is installed, such as a refrigerator, and an operation for preventing an external inflow of foreign substances.

The operation corresponding to each constituent of the inner surface part 230 will be described.

The inner surface part 230 is provided with an extension part 231 that extends to inside of the refrigerator (hereinafter, referred to as an inward extension part), which is bent from an inner end of the side surface part 220 to extend and a first member coupling part 232 bent from an inner end of the inward extension part 231, i.e., toward the inner surface of the first plate member 10. The first member coupling part 232 may contact a protrusion part 112 of the second reinforcement part 110 so as to be hooked. The inward extension part 231 may provide an interval extending toward the inside of the refrigerator so that the first member coupling part 232 is hooked with the inside of the second reinforcement member 110.

Since the first member coupling part 232 is hooked with the second reinforcement member 110, the supporting operation of the sealing frame 200 may be realized. The second reinforcement member 110 may further include a base part 111 coupled to the first plate member 10 and a protrusion part 112 bent and extending from the base part 111. An inertia of the second reinforcement member 110 may increase by a structure of the base part 111 and the protruding part 112 so that ability to resist the bending strength increases.

The first member coupling part 232 and the second member coupling part 233 may be coupled to each other. The first and second member coupling parts 232 and 233 may be provided as separate members to be coupled to each other or may be provided as a single member from the design stage.

A gap formation part 234 that further extends from the inner end of the second member coupling part 233 to the inside of the refrigerator may be further provided. The gap formation part 234 may serve as a portion for providing a space or a space in which components necessary for operation of the appliance such as the refrigerator provided with the vacuum adiabatic body are disposed.

An inclined part 235 that is inclined to the inside of the refrigerator (hereinafter, referred to as an inward inclined part) is further provided. The inward inclined part 235 may be provided so as to be inclined toward the end, that is, toward the first plate member 10 toward the inside of the refrigerator. The inward inclined part 235 may be provided so that a gap between the sealing frame and the first plate member becomes smaller inward. Thus, it is possible to secure a space for mounting a component such as a lamp by cooperation with the gap forming portion 234 while minimizing the volume occupying the internal space of the sealing frame 200 as much as possible.

An inside contact part 236 is disposed on an inner end of the inward inclined part 235. The inside contact portion 236 may be provided with a structure in which an end of the inward inclined part 235 is slightly bent toward the inner surface of the second plate member 10. Thus, the sealing due to the contact between the inner surface part 230 and the second plate member 10 may be completed to prevent foreign substances from being introduced.

When an accessory part such as a lamp is installed on the inner surface part 230, the inner surface part 230 may be divided into two parts to achieve the purpose of the installation convenience of the part. For example, the inner surface part 230 may be divided into a first member for providing the inward extending portion 231 and the first member coupling part 232 and a second member providing the second member coupling part 233, the gap formation part 234, the inward inclined part 235, and inside contact part 236. In a state in which an product such as the lamp is mounted on the second member, the first member and the second member may be coupled to each other in such a manner that the second member coupling part 233 is coupled to the first member coupling part 232. Alternatively, it does not exclude that the inner surface part 230 is provided in more various manners. For example, the inner surface part 230 may be provided as a single member.

Figure 12:
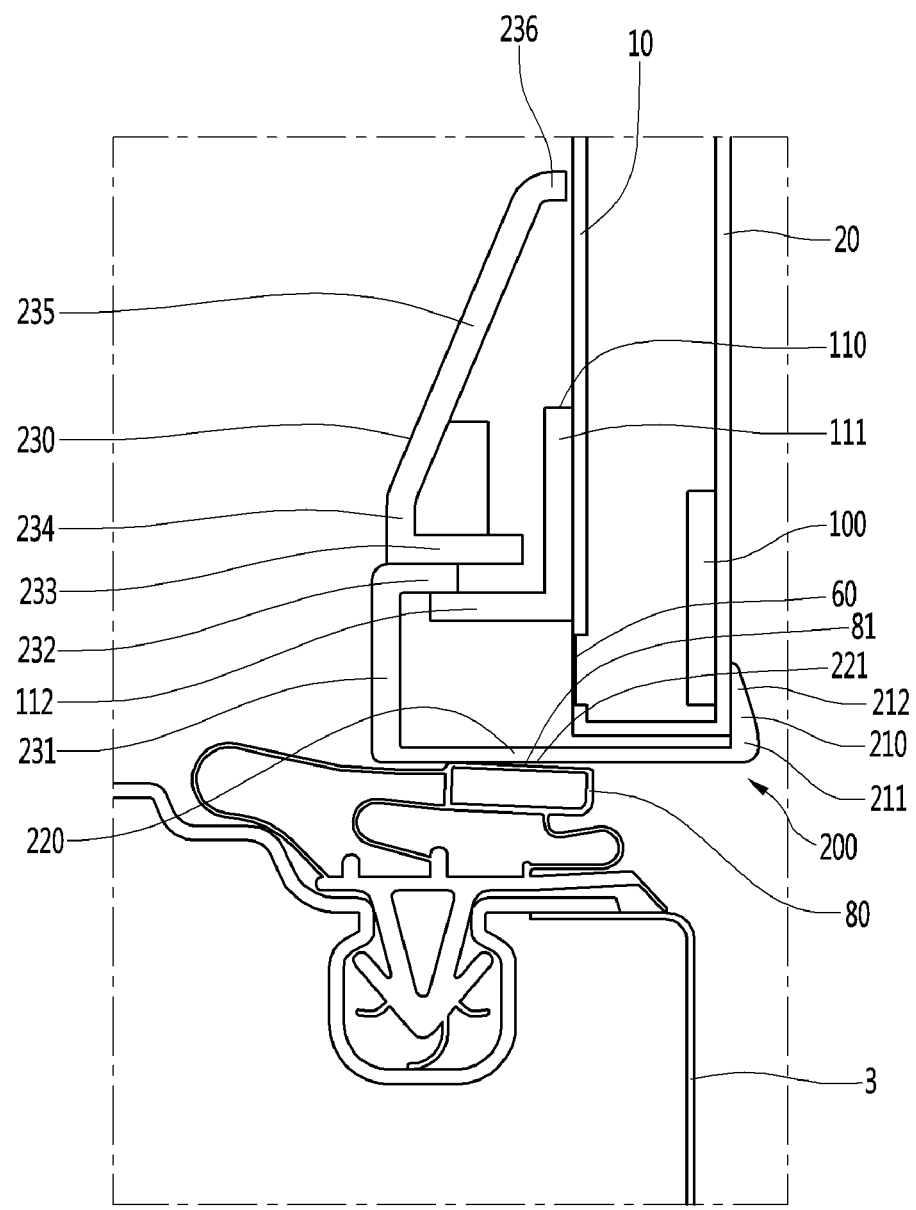
FIG. 12 is a cross-sectional view illustrating a contact part of a main body and a door according to another embodiment.

FIG. 12 is a cross-sectional view illustrating a contact part of a main body and a door according to another embodiment. This embodiment is characteristically different in the position of the conductive resistance sheet and accordingly the change of other portions.

Referring to FIG. 12, in this embodiment, the conductive resistance sheet 60 may be provided inside the refrigerator, but not provided on the edge portion of the end of the vacuum adiabatic body. The second plate member 20 may extend over the outside of the refrigerator and the edge portion of the vacuum adiabatic body. In some cases, the second plate member 20 may extend by a predetermined length up to the inside of the refrigerator. In this embodiment, It may be seen that a conductive resistance sheet is provided at a position similar to the conductive resistance sheet of the door-side vacuum adiabatic body shown in FIG. 4*b*.

In this case, the second reinforcement member 110 may move to the inside of the refrigerator without contacting the conductive resistance sheet 60 in order not to affect the high thermal conductive adiabatic performance of the conductive resistance sheet 60. This is done for achieving a function of a heat bridge of the conductive resistance sheet. Thus, the conductive resistance sheet 60 and the second reinforcement member 110 do not contact each other so that the conductive adiabatic performance by the conductive resistance sheet and the strength reinforcement performance of the vacuum adiabatic body by the reinforcement member are achieved at the same time.

In this embodiment, it may be applied to the case in which perfect thermal protection and physical protection for the edge portion of the vacuum adiabatic body are required.

Figure 13:
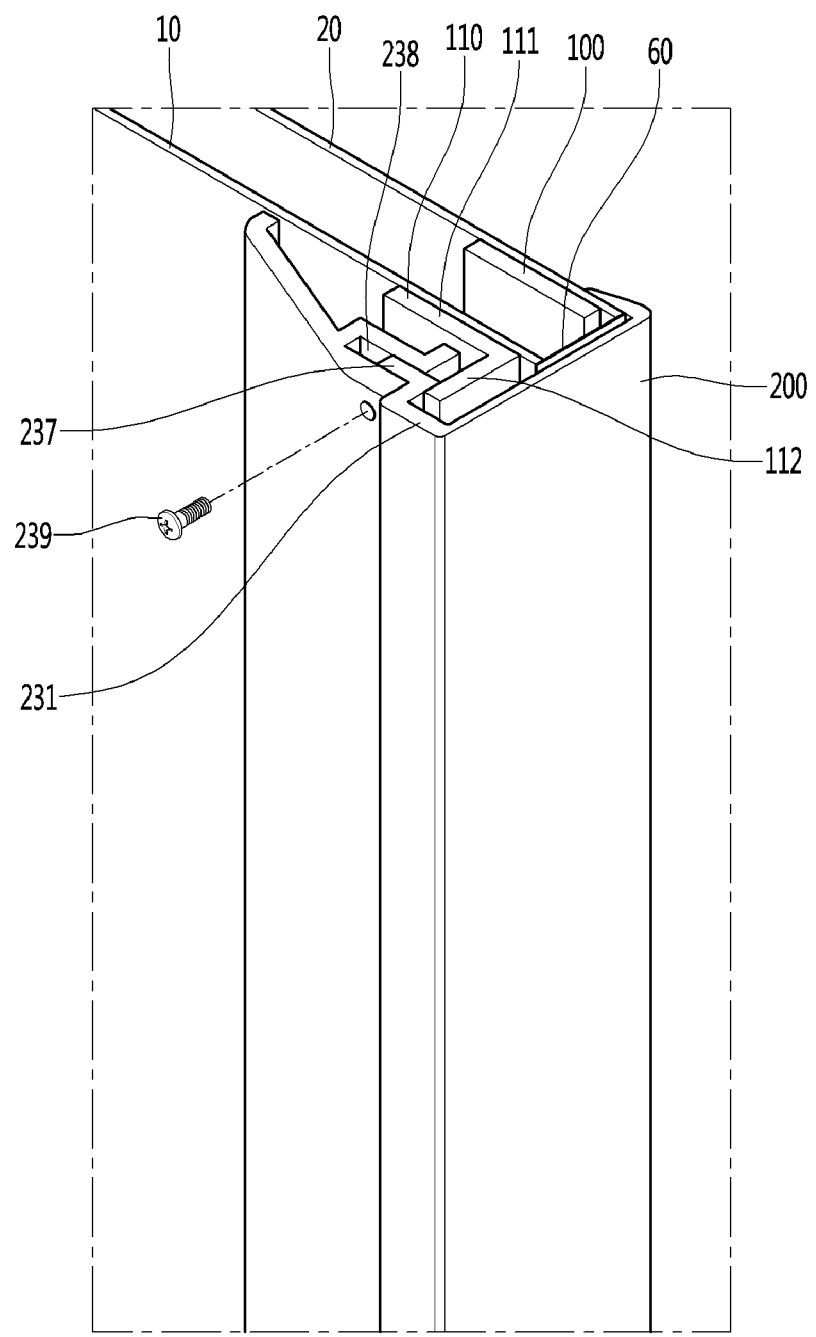
Figure 14:
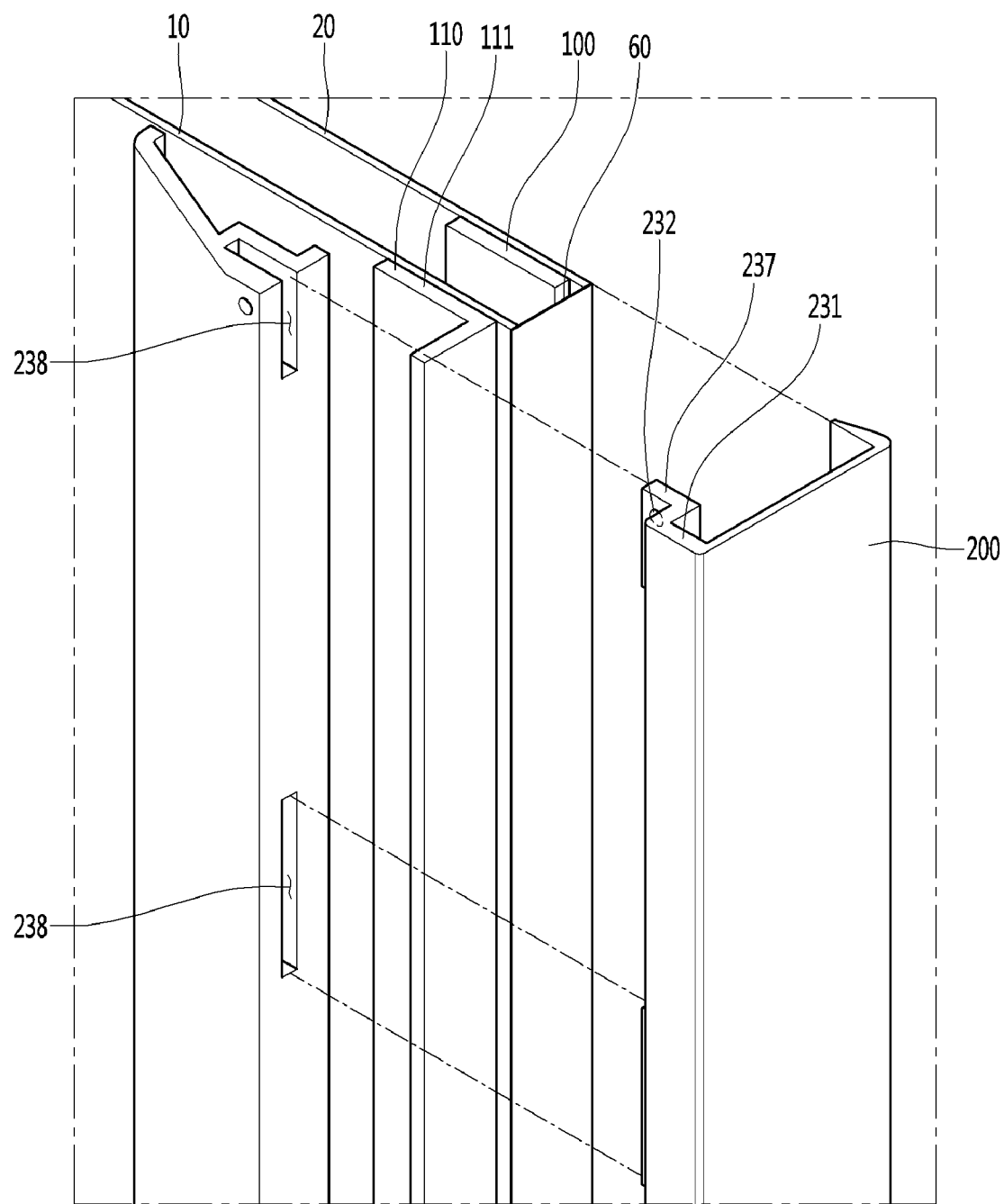

FIGS. 13 and 14 are partial cutaway perspective views illustrating the coupling of the two members in the embodiment in which the inner surface part is divided into two members, wherein FIG. 13 is a state in which the coupling is completed, and FIG. 14 is a view illustrating the coupling process.

Referring to FIGS. 13 and 14, a first member coupling part 232 is hooked with a protrusion part 112 of a second reinforcement member 110, and an outer surface part 210 is supported by a second plate member 20. Thus, a sealing frame 200 may be fixed to an edge portion of the vacuum adiabatic body.

At least one or more first member insertion parts 237 that is bent to extend to the inside of the refrigerator may be provided at end portions of the first member coupling part 232. For example, at least one or more first member insertion parts 237 may be provided for each sealing frame 200 installed in the refrigerator. A second member insertion recess 238 may be provided in a position corresponding to the first member insertion part 237. The first member insertion part 237 and the second member insertion recess 238 may be similar in size and shape to each other. Thus, the first member insertion part 237 may be inserted into the second member insertion recess 238 and then be fitted and fixed.

The coupling of the first member and the second member will be described. In the state in which the first member is coupled to the edge of the vacuum adiabatic body, the second member may be aligned with respect to the first member so that the second member insertion recess 238 corresponds to the first member insertion part 237. When the first member insertion part 237 is inserted into the second member insertion recess 238, the two members may be coupled to each other.

To prevent the coupled second member from being separated from the first member, at least a portion of the second member insertion recess 238 may have a size less than that of the first member insertion part 237. Thus, the two members may be forcibly fitted. To perform an action of being hooked and supported after the second member insertion recess 238 and the first member insertion part 237 are inserted by a predetermined depth, a protrusion and a groove may be respectively provided on/in any point after the predetermined depth. Here, after the two members are inserted at a certain depth, the two members may be inserted further beyond the jaws to allow the two members to be more firmly fixed. Here, the worker may feel that he/she is correctly inserted through the feeling.

The two members constituting the inner surface part may be fixed at the position and the coupling relation by the structure in which the two member are inserted and coupled to each other. Alternatively, when a load is large due to the action of the second member that fixes a separator component, the first member and the second member may be coupled to each other by a separate coupling member such as an inner coupling tool 239.

Figure 15:
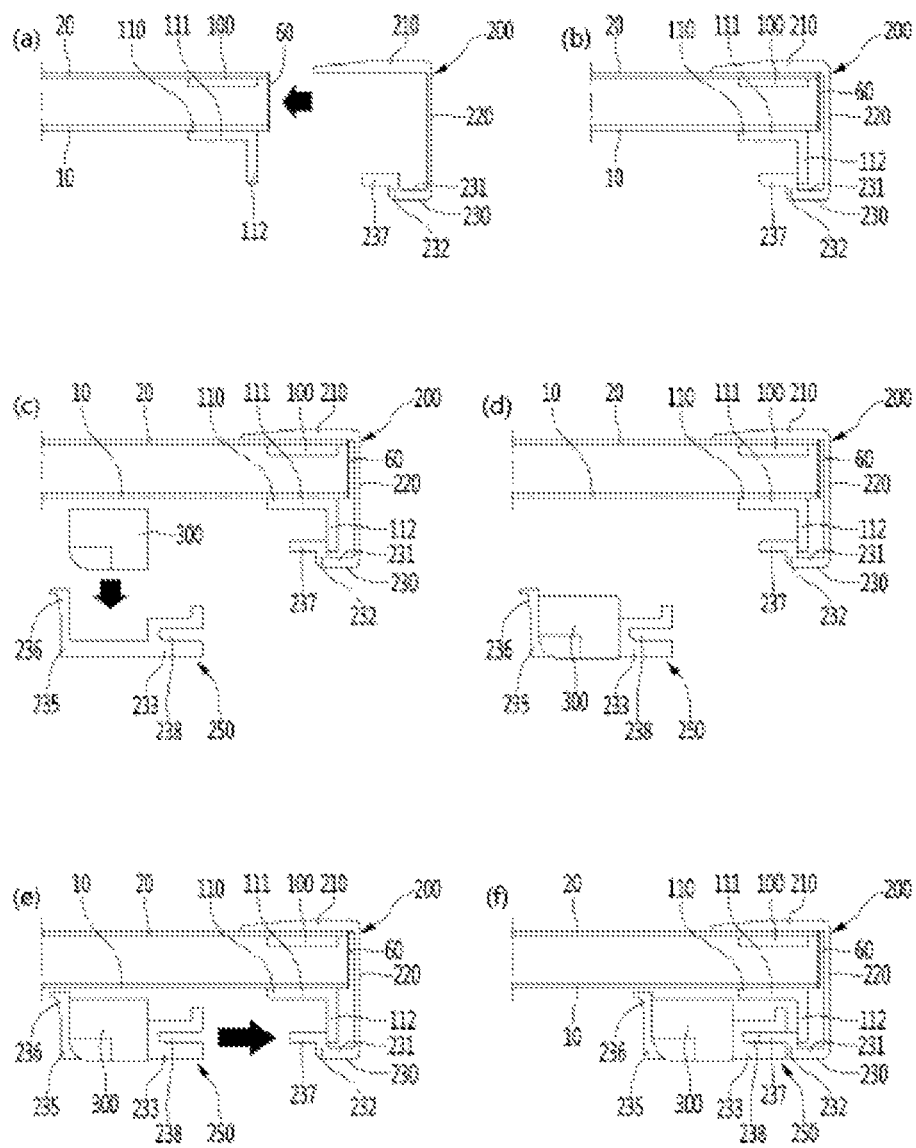
FIG. 15 is a view for sequentially explaining coupling of a sealing frame when the sealing frame is provided as two members according to an embodiment.

FIG. 15 is a view for sequentially explaining coupling of the sealing frame when the sealing frame is provided as two members according to an embodiment. Particularly, a case in which a component is installed on the inner surface part will be described as an example.

Referring to FIG. 15(a), the sealing frame 200 is coupled to the edge portion of the vacuum adiabatic body. Here, the coupling may be performed by using elastic deformation of the sealing frame 200 and restoring force due to the elastic deformation without a separate member such as a screw.

For example, in the state in which the inner surface part 230 is hooked with the second reinforcement member 110, the side surface part 220 and the outer surface part 210 rotate in the direction of the second plate member 20 by using a connection point between the inner surface part 230 and the side surface part 220 as a rotation center. This action may cause elastic deformation of the side surface part 220.

Thereafter, the outer surface part 210 may move inward from the outer surface of the second plate member 20 so that the elastic force of the side surface part 220 acts on the outer surface part 210 and thus lightly coupled. When the coupling of the sealing frame is completed, the sealing frame may be seated in its original position designed in its original shape designed.

Referring to FIG. 15(b), a state in which the first member of the sealing frame 200 is completely coupled is shown. The side surface part 220 may be formed with a thin thickness when compared to that of each of the outer surface part 210 and the inner surface part 230 so that the sealing frame 200 is coupled to the edge of the vacuum adiabatic body by the elastic deformation and the elastic restoring action of the sealing frame.

Referring to FIG. 15(c), a component seating member 250 as a separate component is provided as the second member providing the inner surface part 230. The component seating member 250 may be a component on which the component 399 is placed so that its set position is supported, and an additional function that is necessary for the operation of the component 399 may be further performed. For example, in this embodiment, when the component 399 is the lamp, the gap formation part 234 made of a transparent member may be disposed on the component seating member 250. Thus, light irradiated from the lamp may pass through the inner surface part 230 and be irradiated into the refrigerator, and the user may identify the article in the refrigerator.

The component seating member 250 may have a predetermined shape that is capable of being fitted with the component 399 to fix a position of the component 399.

FIG. 15(d) illustrates a state in which the component 399 is paced on the component seating member 250.

Referring to FIG. 15(e), the component seating member 250 on which the component 399 is seated is aligned in a predetermined direction so as to be coupled to the first member providing the inner surface part. In this embodiment, the first member coupling part 232 and the second member insertion recess 238 may be aligned with each other in the extending direction so that the first member coupling part 232 is inserted into the second member insertion recess 238. Alternatively, although not limited in this way, it may be advantageously proposed to enhance the ease of assembly.

To allow the first member coupling part 232 and the second member insertion recess 238 to be forcibly fitted with respect to each other, the first member coupling part 232 may be slightly larger than the second member insertion recess 238 and have a hook structure such as a protrusion and a projection so as to realize easy insertion.

Referring to FIG. 15(f), the inner surface part in a completely assembled state is illustrated.

Figure 16:
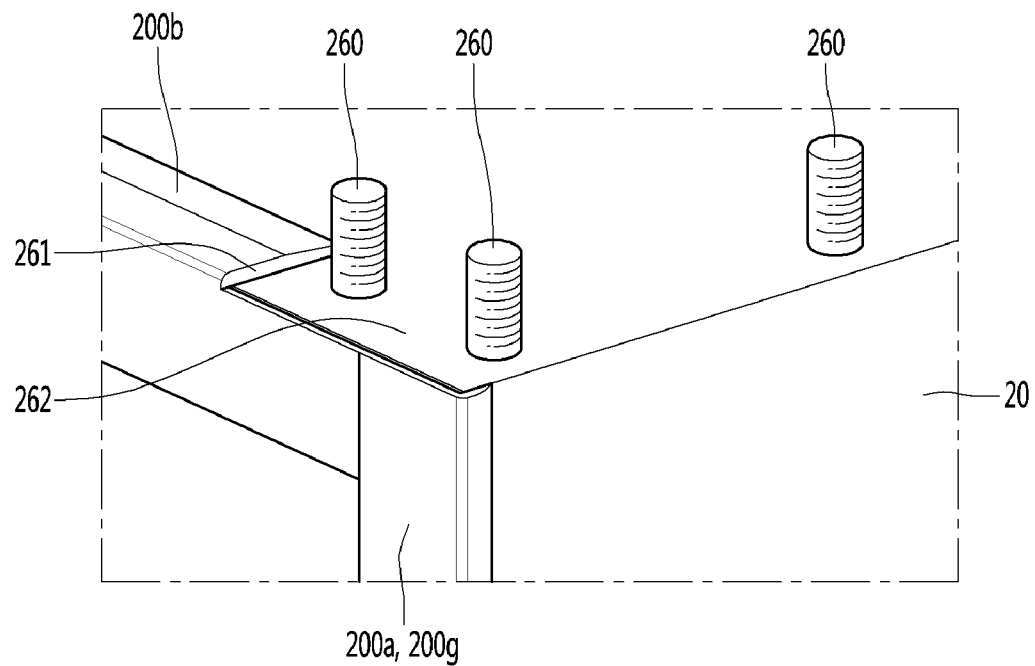
Figure 17:
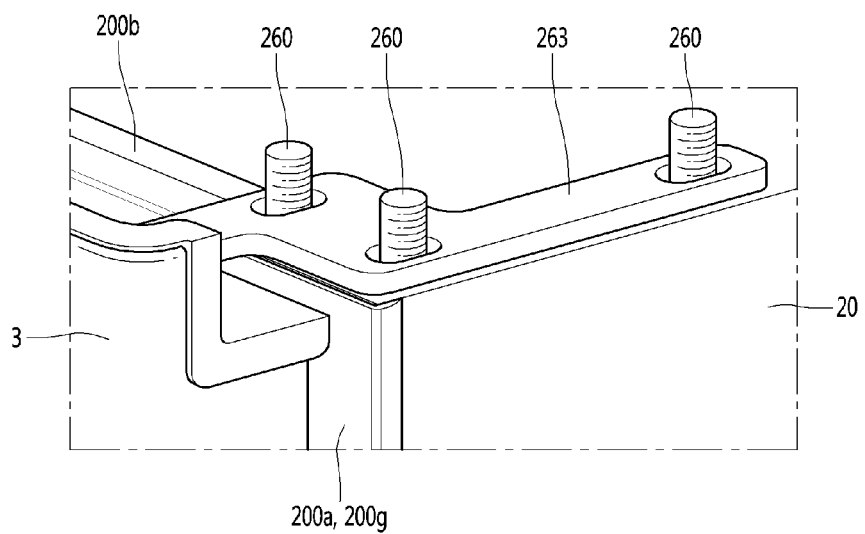

FIGS. 16 and 17 are views illustrating one end portion of the sealing frame, wherein FIG. 16 illustrates a state before a door hinge is installed, and FIG. 17 illustrates a state in which the door hinge is installed.

In the case of the refrigerator, a door hinge is provided at the connection part so that the door-side vacuum adiabatic body is rotatably coupled to the main body-side vacuum adiabatic body. The door hinge has to have predetermined strength and also be capable of preventing drooping of the door due to its own weight in a state in which the door is coupled and preventing the main body from being twisted.

Referring to FIG. 16, to couple the door hinge 263, a door coupling tool 260 is provided on the main body-side vacuum adiabatic body. The door coupling tool 260 may be provided in three. The door coupling tool 260 may be directly or indirectly fixed to the second plate member 20 and/or the reinforcement members 100 and 110 and/or a separate additional reinforcement member (for example, an additional plate further provided on the outer surface of the second plate member). Here, the expression 'direct' may be referred to as a fusing method such as welding, and the expression 'indirect' may refer to a coupling method using an auxiliary coupling tool or the like instead of the fusion or the like.

Since the door coupling tool 260 requires high supporting strength, the door coupling tool 260 may be coupled to the second plate member 20. For this, the sealing frame 200 may be cut, and the sealing frame 200 to be cut may be the upper sealing frame 200*b* at an upper edge of the main body-side vacuum adiabatic body. Also, the sealing frame 200 may include right sealing frames 200*a*, 200*f*, and 200*g* on a right edge of the main body-side vacuum adiabatic body, and a lower side sealing frame 200*e* on a lower edge of the main body-side vacuum adiabatic body. If the door installation direction is different, the left sealing frames 200*a*, 200*f*, and 200*g* at the left edge of the body-side vacuum adiabatic body may be used.

The sealing frame 200 to be cut may have a cutoff surface 261, and the second plate member 20 may have a door coupling tool seating surface 262 to which the door coupling tool 260 is coupled. Thus, the sealing frame 220 may be cut to be exposed to the outside of the door coupling tool seating surface 262, and an additional plate member may be further inserted into the door coupling tool seating surface 262.

The end portion of the sealing frame 200 may not be entirely removed, but a portion of the sealing frame 200 may be removed only at a portion at which the door coupling tool 260 is provided. However, it may be more preferable that all the end portions of the sealing frame 200 are removed to facilitate the manufacture and to firmly support the door hinge 263 on the side of the vacuum adiabatic body.

Figure 18:
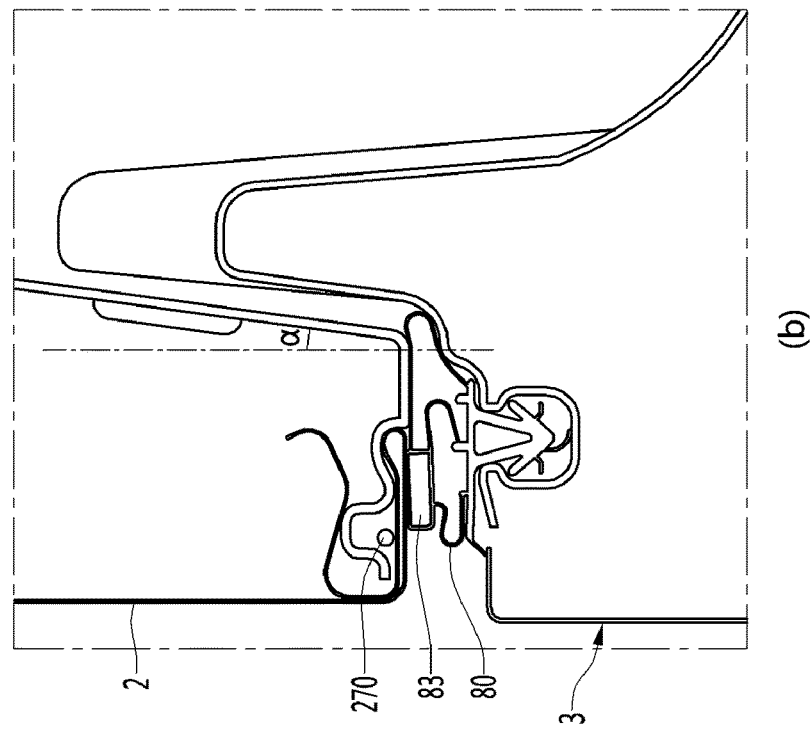
Figure 18:
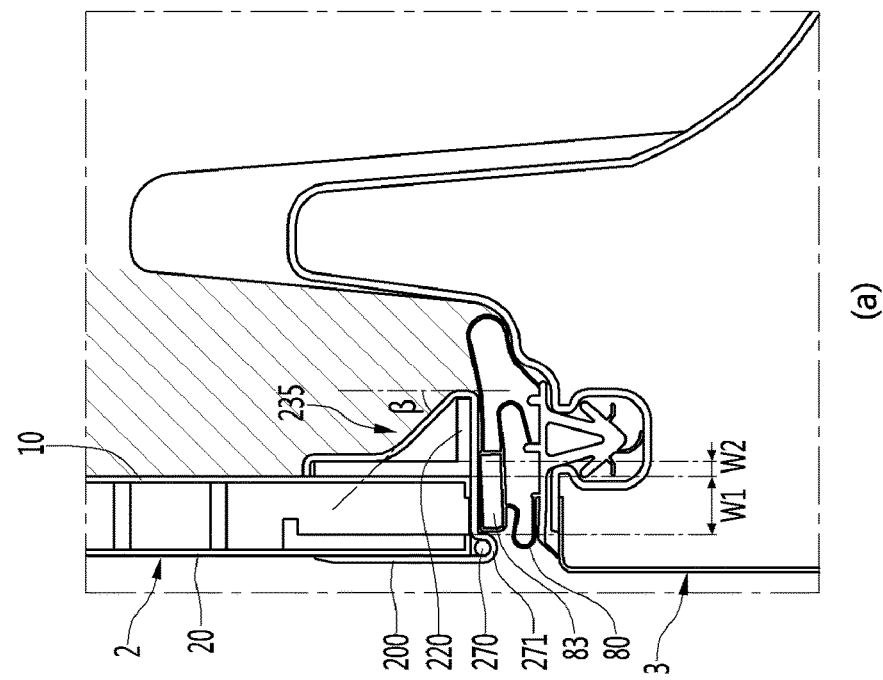

FIG. 18 is a view for explaining an effect of the sealing frame according to an embodiment in comparison with the technique according to the related art, wherein FIG. 18(*a*) is a cross-sectional view of the contact part of the main body-side vacuum adiabatic body and the door according to an embodiment, and FIG. 18(*b*) is a cross-sectional view of the main body and the door according to the related art.

Referring to FIG. 18, in the refrigerator, a hot line may be provided at the contact portion between the door and the main body to prevent dew formation due to sharp temperature change. As the hot line is closer to the outer surface and the edge of the main body, the dew condensation may be removed even with small heat capacity.

According to an embodiment, the hot line 270 may be disposed in an internal space of a gap between the second plate member 20 and the sealing frame 200. A hot line accommodation part 271 in which the hot line 270 is disposed may be further provided in the sealing frame 200. Since the hot line 270 is placed outside the conductive resistance sheet 60, an amount of heat transferred to the inside of the refrigerator is small. Thus, the dew condensation on the main body and the door contact part may be prevented by using smaller heat capacity. In addition, the hot line 270 may be disposed on a relative outside of the refrigerator, i.e., a bent portion between the edge of the main body and the outer surface of the main body to prevent heat from being introduced into the internal space of the refrigerator.

In this embodiment, the side surface part 220 of the sealing frame 200 may have a portion w1 that is aligned with the gasket 80 and the vacuum space part 50 and a portion w2 that is not aligned with the vacuum space part 50 but aligned with the gasket 80 and the internal space of the refrigerator. This is a portion provided by the side surface part 220 to ensure sufficient cold air interruption by the magnet. Thus, the sealing effect by the gasket 80 may be sufficiently achieved by the sealing frame 200.

In this embodiment, the inward inclined part 235 is provided to be inclined toward the inner surface of the first plate member 10 at a predetermined angle β. This makes it possible to give the effect in which the capacity within the refrigerator increases so that the narrow space within the refrigerator is more widely used. That is to say, like the related art, the inward inclined part may be inclined to a direction opposite to the predetermined angle β toward the internal space of the refrigerator to widely utilize a space that is close to the door. For example, more foods may be accommodated in the door, and more space for accommodating various components that are necessary for operation of the device may be defined.

Hereinafter, various embodiments in which the sealing frame 200 is installed will be described with reference to FIGS. 19 to 24.

Figure 19:
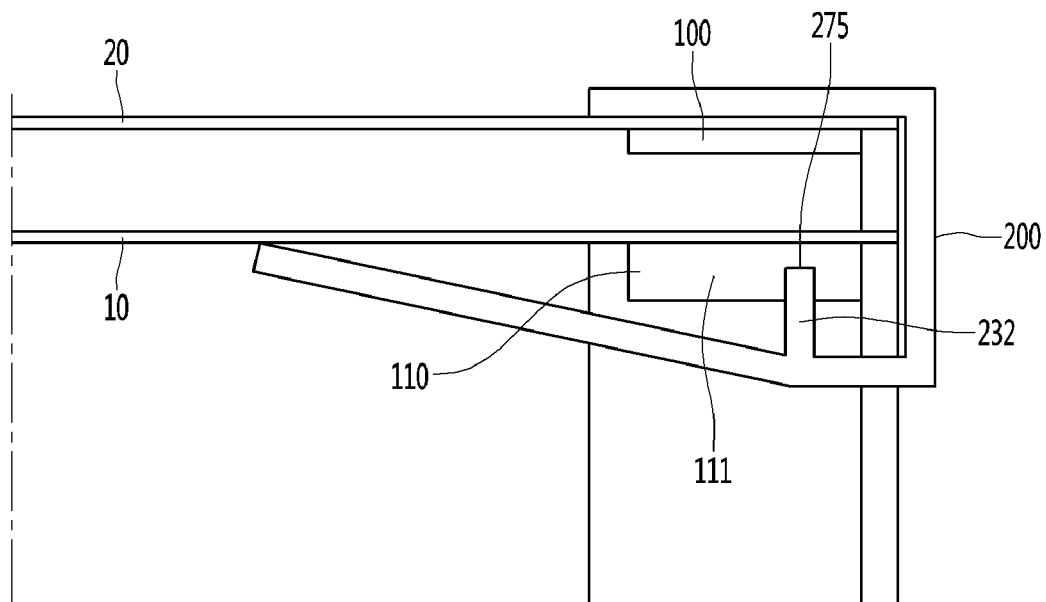
FIGS. 19 to 24 are views illustrating various embodiments in which the sealing frame is installed.

Referring to FIG. 19, the second reinforcement member 110 may include only a base part 111 but do not include a protrusion part 112. In this case, a groove 275 may be provided in the base part 111. An end portion of the first member coupling part 232 may be inserted into the groove 275. In this embodiment, it may be applied in a case of an article which provides sufficient strength without providing the protrusion part 112 on the second reinforcement member 110.

In this embodiment, the sealing frame 200 may be coupled to the end portion of the vacuum adiabatic body by aligning the first member coupling part 232 to be inserted into the groove 275 when the sealing frame 200 is coupled.

According to the coupling action of the groove 275 and the first member coupling part 232, the movement of the sealing frame 200 in the y-axis direction may be stopped through only the coupling of the inner surface part 230 of the sealing frame 200 and the second reinforcement part 110.

Figure 20:
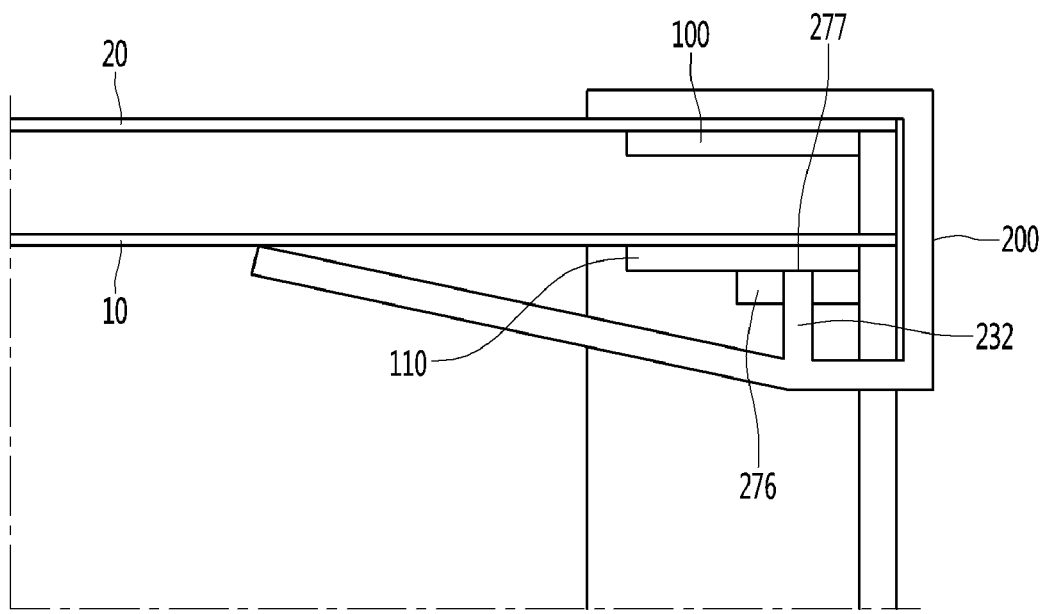

Referring to FIG. 20, the this embodiment is different from the above-described embodiment of FIG. 19 except that the base part 111 is further provided with a reinforcement base part 276. A groove 277 may be further provided in the reinforcement base part 276 so that an end portion of the first member coupling part 232 is inserted. In this embodiment, even though the second reinforcement member 110 is not provided with the protrusion part 112 because of an insufficient space or interference with the installation space, it may be applied when it is necessary to reinforce the strength to a predetermined level. That is to say, it may be applied when the strength reinforcement of the main body-side vacuum adiabatic body is provided at a level of strength reinforcement which is obtained by further providing a reinforcement base 276 at the outer end of the base part 111.

A groove 277 is provided in the reinforcement base part 276, and an end portion of the first member coupling part 232 is inserted into the groove part 277 to align the sealing frame 200 with the vacuum adiabatic body. Thus, the sealing frame 200 may be coupled to the end portion of the vacuum adiabatic body.

According to the coupling action of the groove 277 and the first member coupling part 232, the movement of the sealing frame 200 in the y-axis direction may be stopped through only the coupling of the inner surface part 230 of the sealing frame 200 and the second reinforcement part 110.

Figure 21:
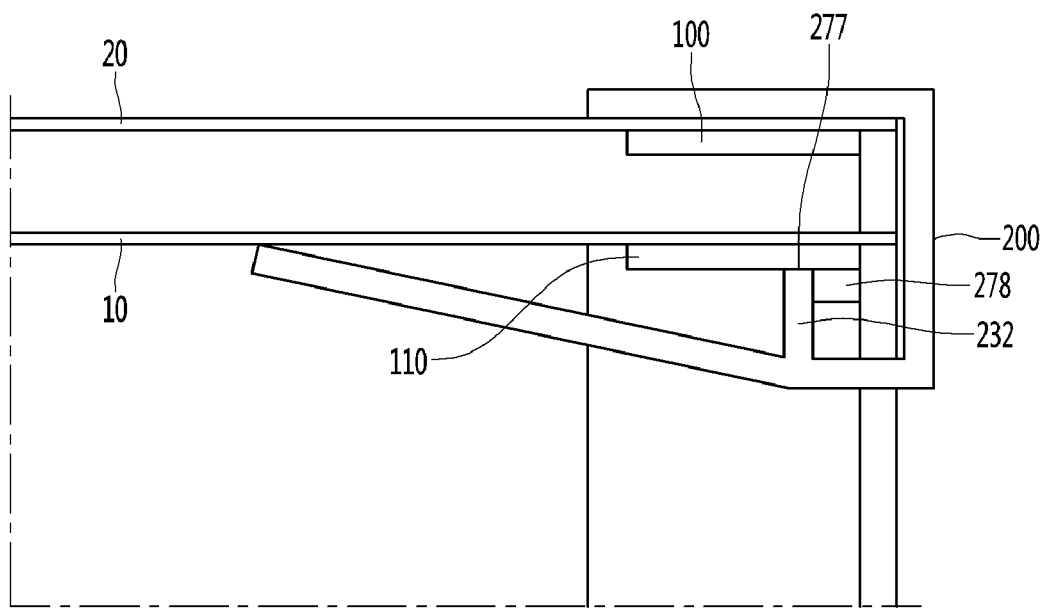

Referring to FIG. 21, the this embodiment is different from the above-described embodiment of FIG. 19 except that the base part 111 is further provided with a reinforcement protrusion 278. The end portion of the first member coupling part 232 may be hooked on the reinforcement protrusion 278. In this embodiment, even though the second reinforcement member 110 is not provided with the protrusion part 112 or the reinforcement base part 276 because of an insufficient space or interference with the installation space, it may be applied when it is necessary to reinforce the strength to a predetermined level and to allow the first member coupling part 232 to be hooked. That is to say, the reinforcement protrusion 278 may be further disposed on an outer end portion of the base part 111 to obtain a strength reinforcement effect of the main body-side vacuum adiabatic body. Also, the reinforcement protrusion 278 may be applied because it provides a hook action of the first member coupling part 232.

The first member coupling part 232 may be hooked to be supported by the reinforcement protrusion 278 so that the sealing frame 200 is coupled to the end portion of the vacuum adiabatic body.

The embodiment proposed in FIGS. 19 to 21 illustrates a case in which the inner surface part 230 is not dived into the first member and the second member but is provided as a single product to be coupled to the vacuum adiabatic body. However, this embodiment is not limited thereto. For example, the sealing frame 200 may be divided into the two members.

Although the second reinforcement member 110 is provided in the above embodiment, a case in which the sealing frame 200 is coupled when a separate reinforcement member is not provided inside the first plate member 10 will be described in the following embodiment.

Figure 22:
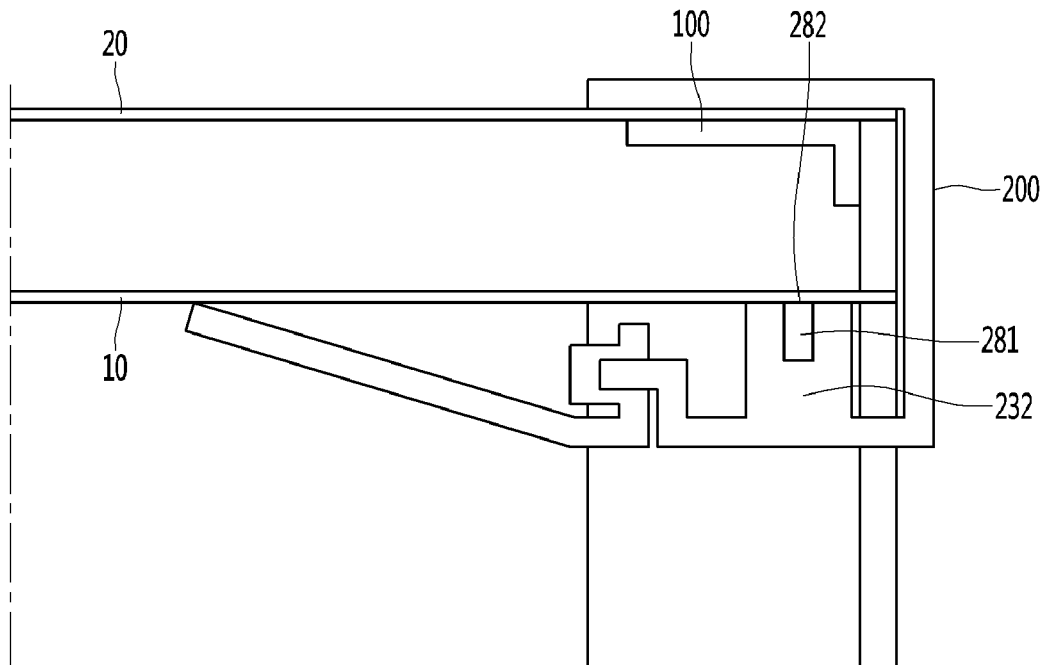

Referring to FIG. 22, although the first reinforcement member 100 is provided to reinforce the strength of the vacuum adiabatic body, the second reinforcement member 110 is not provided separately. In this case, an inner protrusion 281 may be provided on the inner surface of the first plate member 10 so that the sealing frame 200 is coupled. The inner protrusion 281 may be coupled to the first plate member 10 by welding or fitting. This embodiment may be applied to a case in which the sufficient strength of the main body-side vacuum adiabatic body is obtained only by the reinforcement member provided in the first reinforcement member 100, that is, the inside of the vacuum space part 50, and the reinforcement member is installed on a side of the second plate member 20.

The first member coupling groove 282 may be provided in the first member coupling part 232 so as to be inserted and fixed to the inner protrusion 281. The inner protrusion 281 may be inserted into the first member coupling groove 282 so that a coupled position of the sealing frame 200 is fixed.

Figure 23:
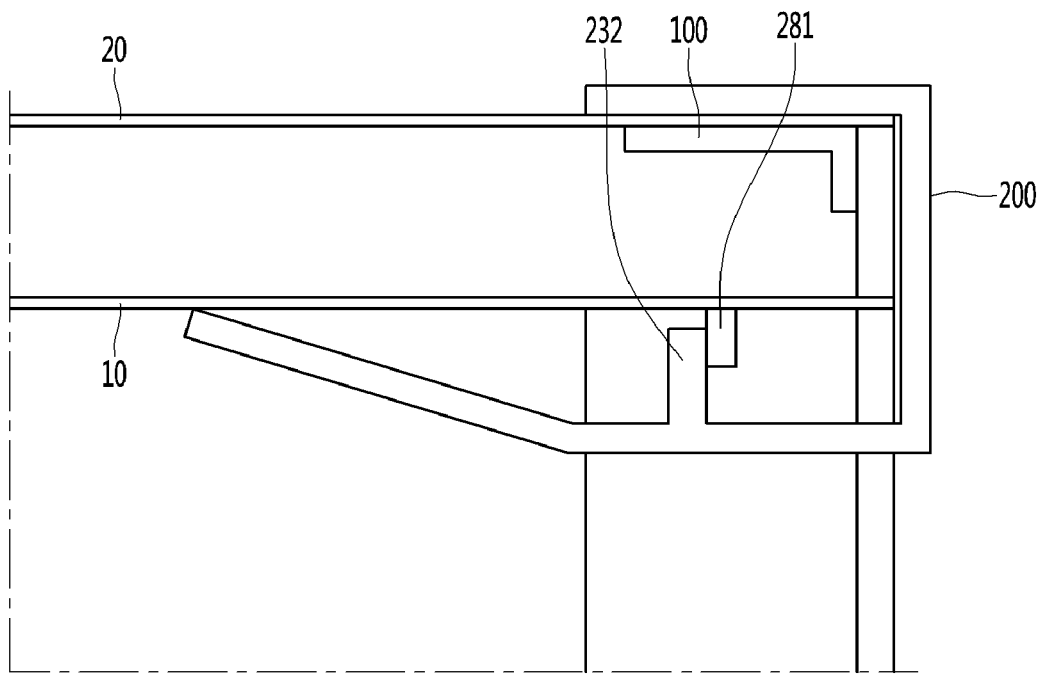

Referring to FIG. 23, it is characteristically different that the first member coupling groove 282 is not provided as compared with the embodiment shown in FIG. 22. According to this embodiment, one end of the first member coupling part 232 may be supported by the inner protrusion 281 so that the position of the sealing frame 200 is supported.

When compared to the embodiment proposed in FIG. 22, this embodiment may have a disadvantage in that the movement of the sealing frame 200 is stopped in only one direction, instead that the movement of the sealing frame 200 in the y-axis direction is stopped by the inner protrusion 281 and the first member coupling groove 282 in both directions. However, an advantage that the worker conveniently works when the sealing frame 200 is coupled may be expected.

In the embodiment proposed in FIGS. 19 to 23, a side of the first plate member 10 is fixed, and a side of the second plate member 20 is provided with a constituent in which the movement such as sliding or the like is allowed. That is to say, the second plate member 20 and the outer surface part 210 are allowed to be relatively slidable, and relative movement of the first plate member 10 and the inner surface part 230 is not allowed. Such the constituent may be configured opposite to each other. Hereinafter, such the constituent will be proposed.

Figure 24:
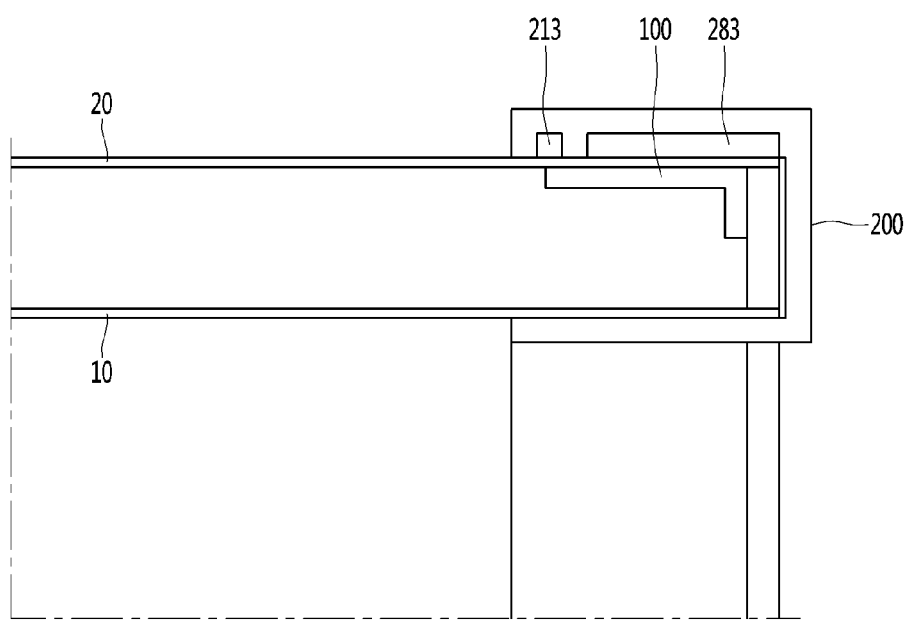

Referring to FIG. 24, an outer protrusion 283 may be provided on the outer surface of the second plate member 20, and an outer hook part 213 may be provided on the outer surface 210 of the sealing frame 200. The outer hook part 213 may be hooked to be supported by the outer protrusion 283.

In case of this embodiment, the inner surface part 230 of the sealing frame 200 may be allowed to move with respect to the inner surface part of the first plate member 10 such as the sliding or the like. In this embodiment, mounting and fixing of the sealing frame 200 are different only in the direction, and the same description may be applied.

Various embodiments may be further proposed in addition to the embodiment related to FIG. 24. For example, the reinforcement member 100 and 110 may be further provided on the second plate member 20, and various structures of FIGS. 19 to 21 may be provided for the reinforcement member. Also, the outer hook part 213 may be provided as a groove structure as shown in FIG. 22.

According to this embodiment, there is a difference in configuration such that the coupling direction of the sealing frame 200 is provided in the opposite direction of the original embodiment. However, the fundamental function of the sealing frame may be obtained in the same way.

Hereinafter, a description will be given of a constituent in which constitution in which components are installed in a device such as the refrigerator to which the vacuum adiabatic body is applied, and the electric line is applied to a component.

Figure 25:
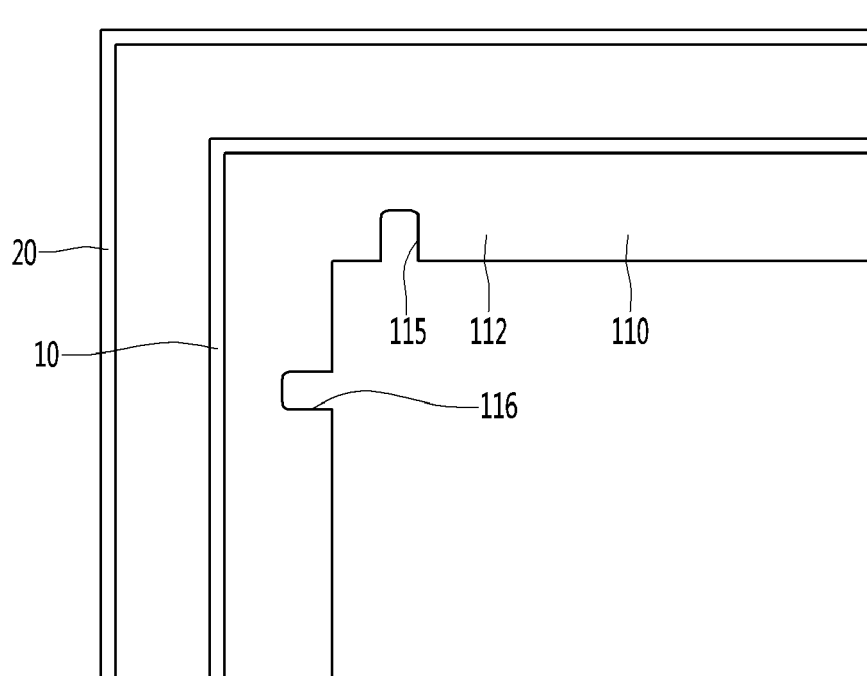
FIG. 25 is a view observing an upper right side of the main body-side adiabatic body when viewed from a front side.

FIG. 25 is a view observing an upper right side of the main body-side adiabatic body when viewed from a front side.

Referring to FIG. 25, a reinforcement member 100, more particularly, a second reinforcement member 110 are provided together with the first plate member 10 and the second plate member 20. The second reinforcement member 110 is placed on the inner surface of the first plate member 10 to reinforce the strength of the main body-side vacuum adiabatic body. The second reinforcement member 110 is provided in a long rod shape along the edge of the vacuum adiabatic body to reinforce the strength of the vacuum adiabatic body.

A slit may be provided in the protrusion part 112 of the second reinforcement member 110. The slits 115 and 116 serve as holes through which the electric lines pass so that the operator conveniently locates the electric lines. Since the electric lines are disposed in the slits, damage of the electric lines due to bending of the electric lines may be prevented.

The slit may be provided with a first slit 115 provided in the second reinforcement member 110 at the edge portion of the upper surface of the vacuum adiabatic body or a second slit 115 provided in the second reinforcement member 11 at the edge portion of the side surface of the vacuum adiabatic body. The slit may be provided to correspond to a portion through which the electric line passes and may be disposed at another position of the second reinforcement member 110.

Figure 26:
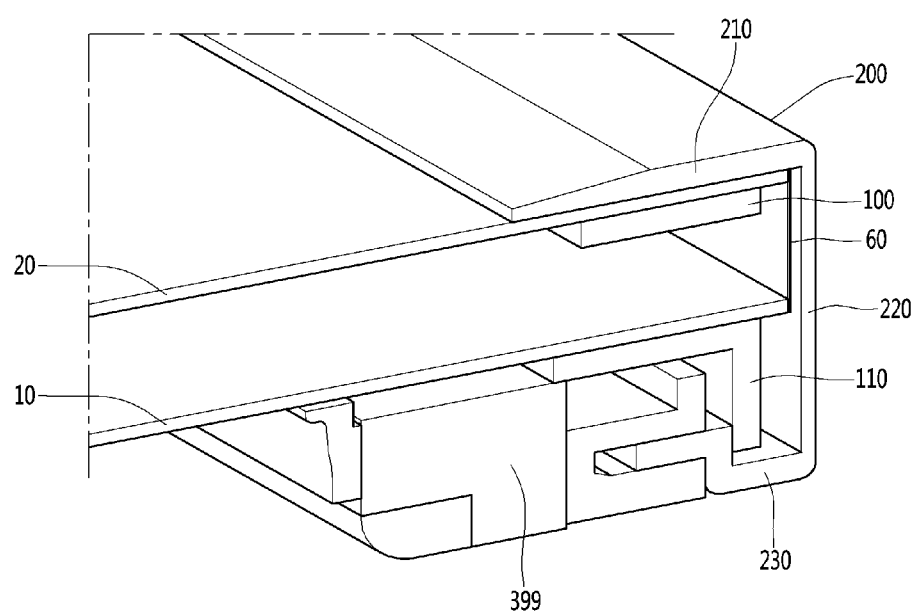

In the case of the embodiment, the lamp for illuminating the inside of the refrigerator is exemplified as a component, and the slit may be provided in the end portion of each edge to guide the electric line of the component (see reference numeral 399 in FIG. 26).

Since the slits 115 and 116 act as stress concentration points for weakening the strength of the reinforcement member, the slits 115 and 116 may not remove the entire protrusion 112 as much as possible but be remove the protrusion up to a height at which the electric line is led out.

Vertex portions of the slits 115 and 116 may be chamfered to provide smooth rounded-shape. Thus, the electric line passing through the slit may be prevented from being damaged.

Figure 27:
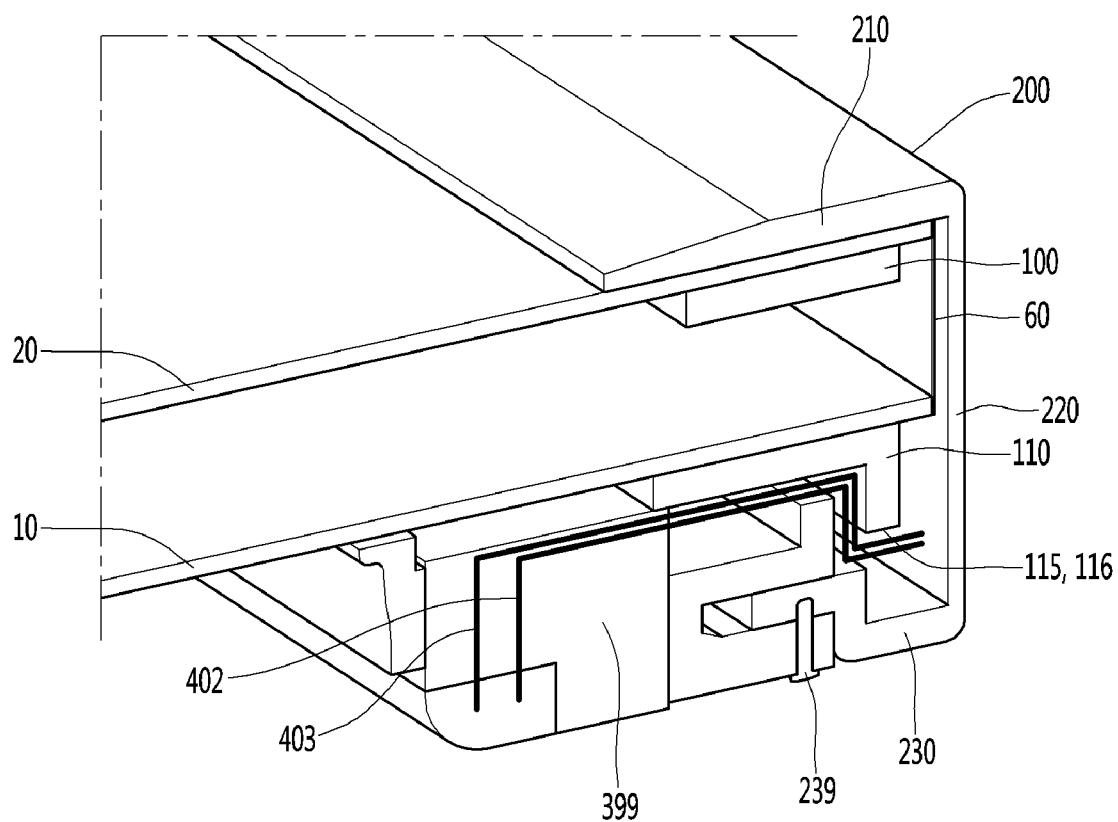

FIGS. 26 and 27 are cross-sectional views of the edge portion of the vacuum adiabatic body in a state in which a lamp is installed, wherein FIG. 26 is a cross-sectional view of a portion through which an electric line of the lamp does not pass, and FIG. 27 is a cross-sectional view of a portion through the electric line of the lamp pass. Hereinafter, the lamp will be described as a component, for example, and referred to as a lamp, but it may be called a component.

Referring to FIGS. 26 and 27, a state in which the component 399 is installed may be confirmed, and the lamp is placed as one component that is necessary for the refrigerator in the gap forming part 234. Electric lines 402 and 403 of the component 399 extend outward at a gap between the inner surface part 230 and the second reinforcement member 110. In detail, the electric lines 402 and 403 may extend outward from gaps between the first member coupling part 232, the second member coupling part 233, and the second reinforcement member 110.

The end portion of the second member coupling part 233 is spaced a predetermined distance from the base part 112 to provide a gap through which the second member coupling part 233 pass the electric line 402. Alternatively. the second member coupling part 233 may be provided with a slit such as that provided in the protruding part 112.

Referring to FIG. 26, the first member coupling part 232 and the protrusion part 112 contact each other to support the sealing frame 200. Referring to FIG. 27, the slits 115 and 116 may extend beyond the ends of the first member coupling part 232. The electric line may be led out of the protrusion part 112 through the gap between the slits 115 and 116 and the end portion of the first member coupling part 232. According to the configuration of the slits 115 and 116, the electric lines 402 and 403 may be guided to the outside through the slits. Here, an interference structure capable of damaging the electric lines 402 and 403 may not be provided.

Figure 28:
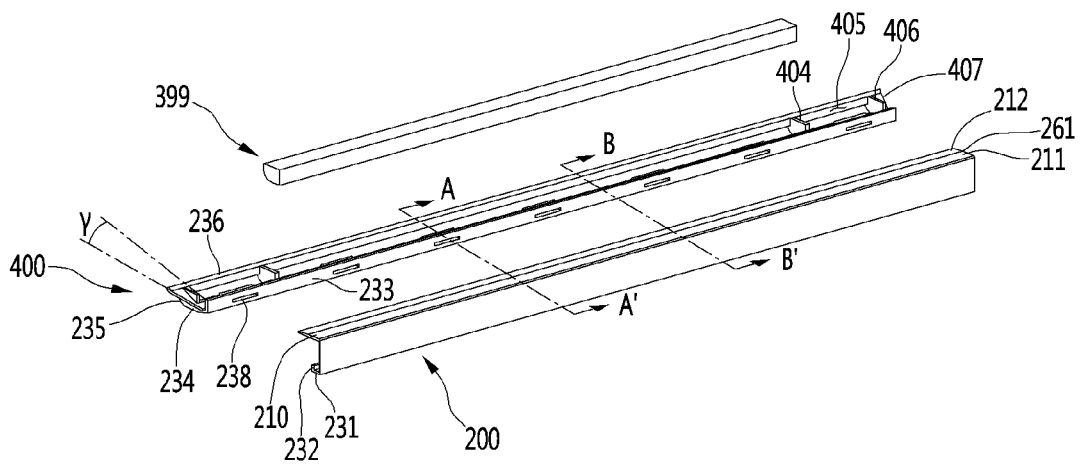
FIG. 28 is an exploded perspective view of a peripheral portion of a component.

FIG. 28 is an exploded perspective view of a peripheral portion of a component.

Referring to FIG. 28, a component 399, a component fixing frame 400 on which the component 399 is seated, and the sealing frame 200 are illustrated.

The component fixing frame 400 provides a portion of the inner surface part 230 of the sealing frame 200. The component fixing frame 400 has components for seating the component 399.

The component fixing frame 400 may have a shape that extends in one direction and may be a member corresponding to the second member constituting the inner surface part when viewed from a cross-section and may provide the second member coupling part 233 and the gap formation part 234, the inward inclined part 235, and the inside contact part 236. The above-described functions and actions as described above may be applied as they are when viewed in cross-section.

In the component fixing frame 400, a second member insertion recess 238 may be provided in the end portion of the first member coupling part 232 at a position corresponding to the first member insertion part 237 which is bent to extend to the inside of the refrigerator. The first member insertion part 237 and the second member insertion recess 238 may be similar in size and shape to each other. Thus, the first member insertion part 237 may be inserted into the second member insertion recess 238 and then be fitted and fixed. The first member insertion part 237 and the second member insertion recess 238 may be coupled to each other by an additional internal cooling tool 239. In other cases, the component fixing frame 400 may be directly coupled to the second reinforcement member 110.

The internal space of the gap formation part 234 and the inward inclined part 235 may form a space in which the component 399 is seated. A seating rib 404 may be disposed on inner surfaces of the gap formation part 234 and the inward inclined part 235. The component seating rib 404 may fix the lamp seating position as a portion where both end portions of the lamp are supported.

An electric line accommodation rib 406 may be provided outside the component seating rib 404. A gap part between the component seating rib 404 and the electric line accommodation rib 406 may provide an electric line accommodation part 405. The electric line accommodation part 405 provides a space in which the electric line for applying power to the component 399 is disposed, or a predetermined component that is necessary for the operation of the component 399 is accommodated. The electric line accommodation ribs 406 and the electric line accommodation part 405 may be provided on both sides of the component fixing frame 400. Thus, inventory costs may be reduced through the commonality of the components.

The electric lines 402 and 403, which are led out of the electric line accommodation part 405, may pass through the gap part between the upper end of the first member coupling part 233 and the base part 111. The electric lines 402 and 403 may pass through the slits 115 and 116 and led into the gap part between the side surface part 220 of the sealing frame 200 and the protrusion part 112 and then be guided to other places along the gap part.

An inclined rib 407 may be disposed on both end portions of the component fixing frame 400. The inclined rib 407 are provided so as to be widened backward from a front end portion of the component fixing frame 400. In the drawings, when referring to an indication line extending along the electric line along the electric line accommodation rib 406 and an indication line extending along an end of the inclined rib 407, it will be more clearly understood when referring to an angle γ between the indication lines.

The inclined rib 407 is configured so that the component fixing frame 400 contacts the inner surface part 230 of the sealing frame 200 adjacent to the component fixing frame 400 to remove a gap between the members. Thus, in the case of a refrigerator, it is possible to provide a wider internal space within the refrigerator. For example, the sealing frame 200 adjacent to the component fixing frame 400 may accurately contact corresponding to an inclined angle of the inward inclined part 235 provided as the reference symbol β in FIG. 18.

Figure 29:
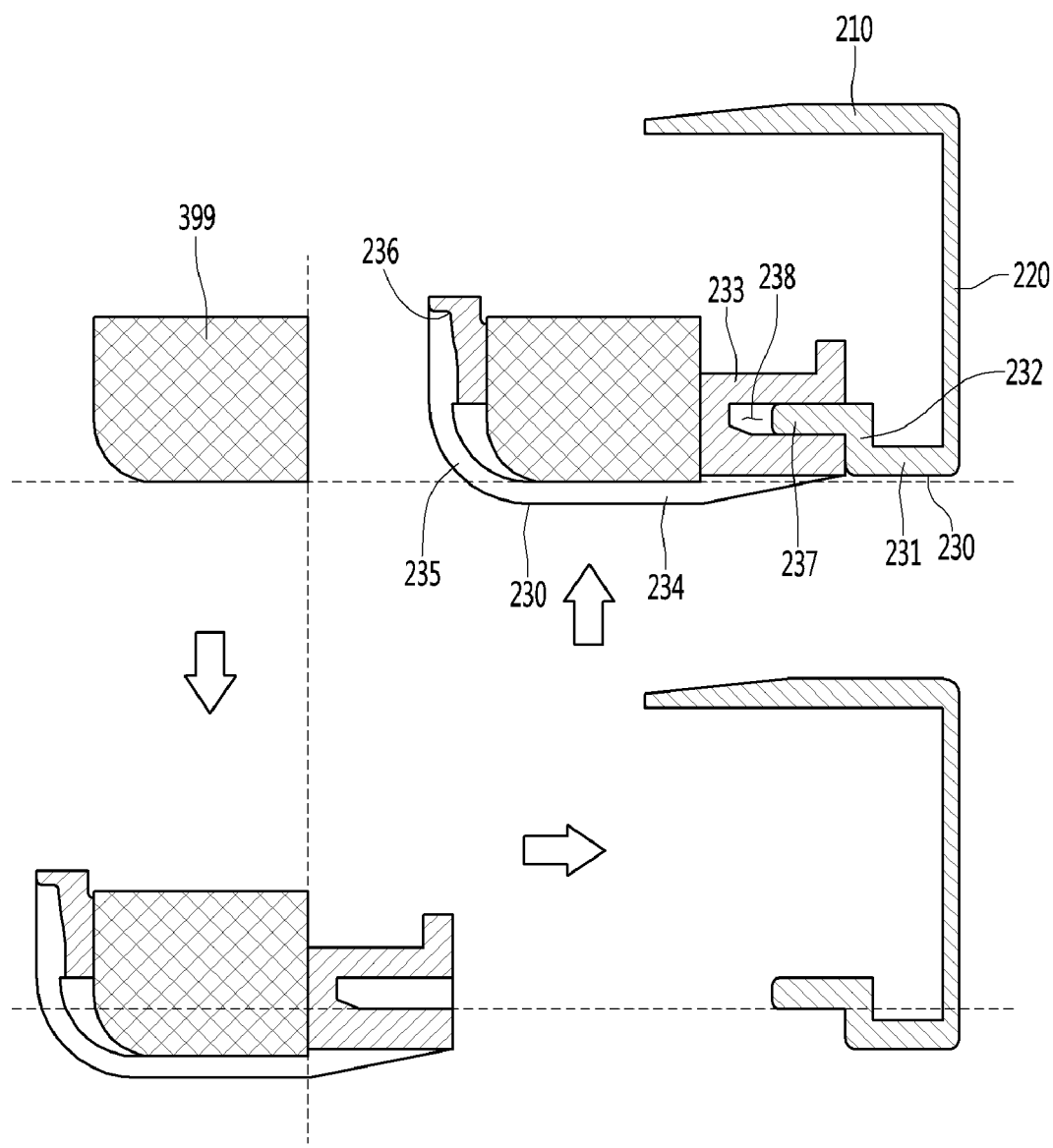
FIGS. 29 and 30 are cross-sectional views taken along line A-A' and B-B'.
Figure 30:
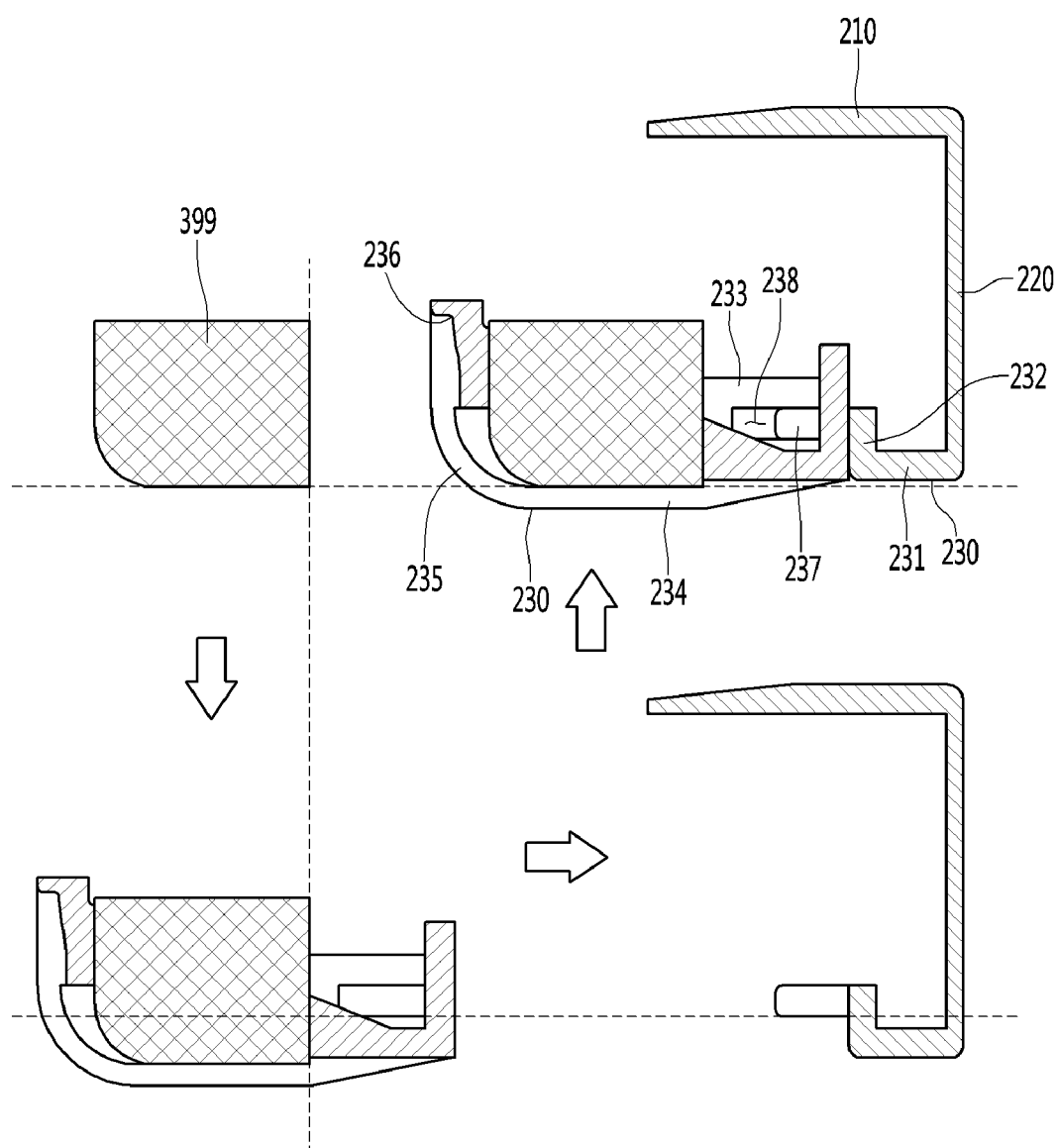

FIGS. 29 and 30 are cross-sectional views taken along line A-A' and B-B' in FIG. 28 and are shown in time sequence. The coupling between the sealing frame and the component fixing frame may be understood with reference to FIG. 29, and the alignment of the sealing frame and the component fixing frame may be understood with reference to FIG. 30.

Referring to FIGS. 29 and 30, when the component 399 is placed on the component fixing frame 400, and the component is the lamp on the lower side of the component 399, the gap formation part 234 may be provided as a transparent member to emit light. Thus, light irradiated from the lamp may pass through the inner surface part 230 and be irradiated into the refrigerator, and the user may identify the article in the refrigerator.

The component fixing frame 400 on which the component 399 is seated is aligned in a predetermined direction so as to be coupled to the sealing frame 200. In this embodiment, the first member insertion part 237 and the second member insertion recess 238 may be aligned with each other in the extending direction of each of the members so that the first member insertion part 237 is inserted into the second member insertion recess 238.

To allow the first member insertion part 237 and the second member insertion recess 238 to be forcibly fitted with respect to each other, the first member insertion part 237 may be slightly larger than the second member insertion recess 238 and have a hook structure such as a protrusion and a projection so as to realize easy insertion.

Hereinafter, a path of the electric line led out to the outside of the protrusion part 112 of the second reinforcement member 110 through the slits 115 and 116 will be described.

Figure 31:
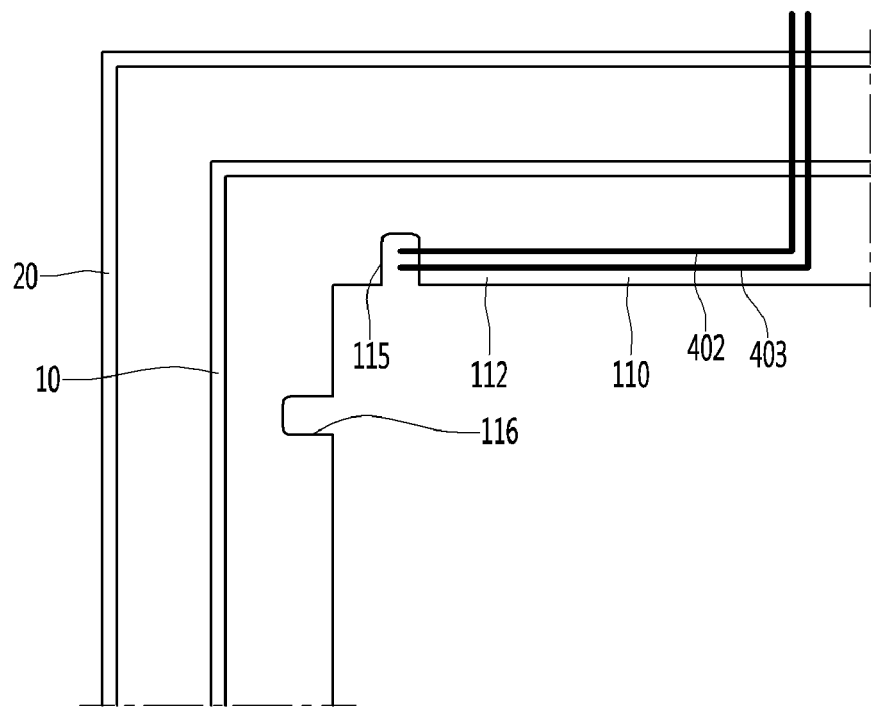
FIG. 31 is a view observing a portion of an upper portion of the refrigerator when viewed from a front side.
Figure 32:
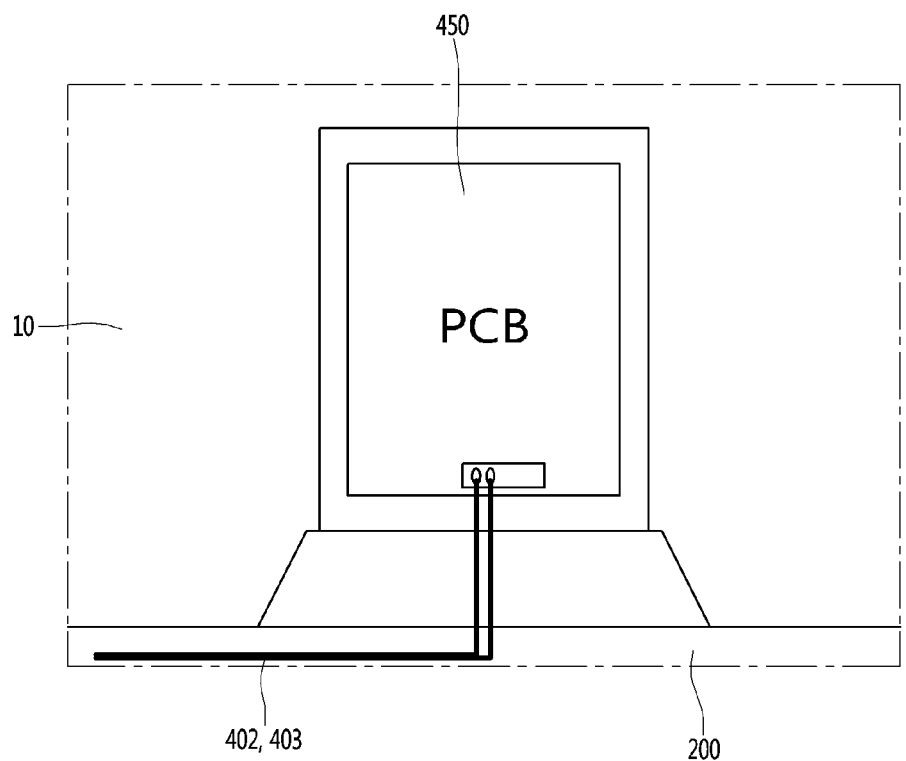
FIG. 32 is a schematic view illustrating a top surface of the refrigerator when viewed from the outside.

FIG. 31 is a view observing a portion of an upper portion of the refrigerator when viewed from a front side, and FIG. 32 is a schematic view illustrating a top surface of the refrigerator when viewed from the outside.

Referring to FIGS. 31 and 32, the electric lines 402 and 403 led out through the slit 115 may move in any direction along the gap between the protrusion pat 112 and the side surface part 220 of the sealing frame 200.

The sealing frame 200 is a member to be observed on the outside and has a gap without contacting internal components so as to have an elegant outer appearance. The sealing frame 200 may do not contact the conductive resistance sheet 60 to prevent cold air from being lost due to the contact with the conductive resistance sheet 60. Thus, the electric lines 402 and 403 may move through the gap between the sealing frame 200 and the internal component. The electric lines 402 and 403 may move through the gap between an outer surface of the protrusion part 112 and the side surface part 220 of the sealing frame 200 to prevent the cold air from being lost due to the contact between the conductive resistance sheet and the electric lines 402 and 403.

A main controller 450 is disposed on a top surface of the refrigerator. The main controller 450 is a portion on which electrical components including a processor for controlling the overall operation of the refrigerator are mounted. Since the main controller 450 is placed on the top surface of the refrigerator, it is convenient to easily perform the after-service without moving the position of the refrigerator.

The component 399 is a member operating under the control of the main controller 450. The electric line may extend toward the main controller along any one edge through the gap between the outer surface of the protrusion part 112 and the side surface part 220 of the sealing frame 200. The electric line may be led to the main controller 450 after moving to the rectilinear forward of the main controller 450. In detail, the electric line passes through the gap between the outer surface part 210 and the second plate member 20 after passing through the gap between the side surface part 220 of the sealing frame 200 and the conductive resistance sheet 60 to reach the main controller 450.

The electric lines 402 and 403 may be exemplified by a lead-in line and a lead-out line for power, and a connector may be mounted in advance at an end portion thereof. The worker may complete the assembly by inserting the connector of the main controller 450 into a socket.

Figure 33:
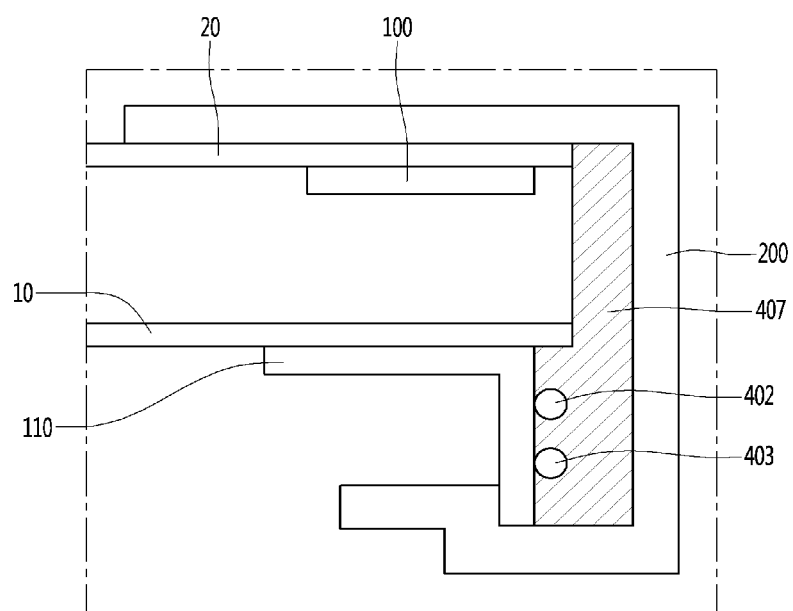
FIG. 33 is a cross-sectional view illustrating an upper end portion of the refrigerator.

FIG. 33 is a cross-sectional view illustrating an upper end portion of the refrigerator.

Referring to FIG. 33, it may be seen that the electric lines 402 and 403 pass the gap between the second reinforcement member 110 and the sealing frame 200. Here, the electric lines 402 and 403 may approach the second reinforcement member 110. This is because an adiabatic material 470 is inserted in the gap between the conductive resistance sheet 60 and the sealing frame 200 and the gap between the second reinforcement member 110 and the sealing frame 200 in the coupling process.

The adiabatic material 407 is provided to prevent the cold air loss of the conductive resistance sheet 60 and to prevent the cold air from being lost outside the second reinforcement member 110. The original shape of the sealing frame 200 may be maintained by the adiabatic material 407, and the installation positions of the electric lines 402 and 403 may be fixed.

Hereinafter, the electric line connecting the inside and the outside of the refrigerator, the operation of the electric line and the control of the refrigerator by the electric line will be described.

Figure 34:
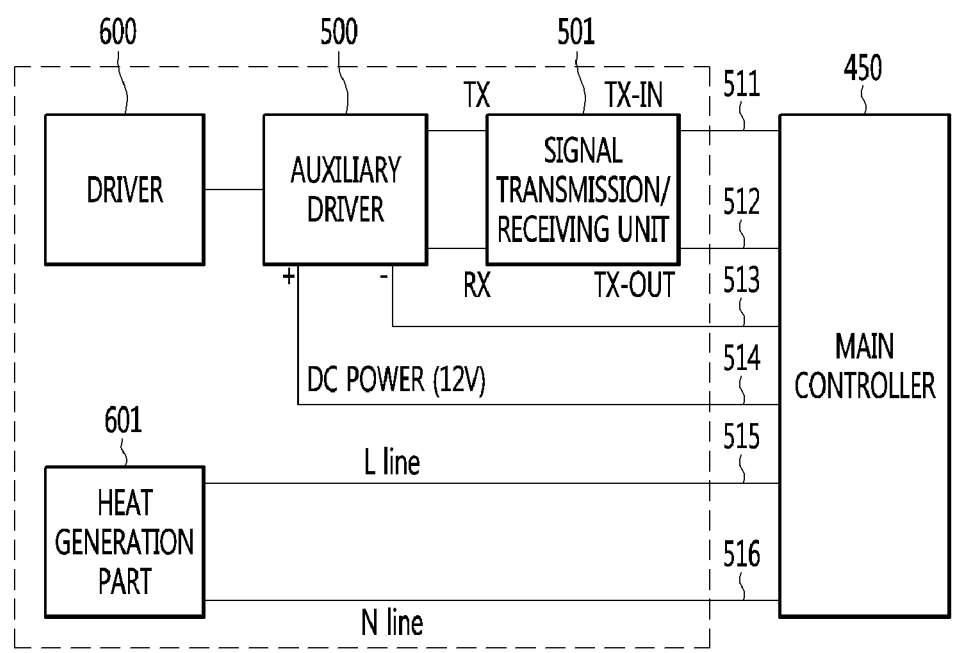
FIG. 34 is a view for explaining a control of the refrigerator.

FIG. 34 is a view for explaining a control of the refrigerator. In FIG. 34, a dotted line indicates a line separating the inside and the outside of the refrigerator, and the inside of the rectangle provided by the dotted line indicates the inside of the refrigerator.

Referring to FIG. 34, a main controller 450 is disposed outside the refrigerator. The main controller 450 is responsible for the overall control of the appliance to which the vacuum adiabatic body is applied. When the appliance is a refrigerator, the main controller 450 performs overall control of the refrigerator. The main controller 450 may be placed on a top surface of the refrigerator as shown in FIG. 32. Hereinafter, the refrigerator will be described as an example, but it is needless to say that it is not limited to the refrigerator.

In the main controller 450, six lines may be led into the refrigerator. Two AC lines 515 and 516 of the six lines supply energy to a heat generation part 601 in which AC power is used. Two DC lines 513 and 514 of the six lines are lines for supplying energy to various drivers 600 and an auxiliary controller 500 in which DC power is used in the refrigerator. Two signal lines 511 and 512 of the six lines are lines for supplying a control signal to the various drivers 600 and the auxiliary controller 500, which perform the control in the refrigerator.

The auxiliary controller 500 and the main controller 450 are connected by a connection line. The connection line may include the two DC lines 513 and 514 and the two signal lines 511 and 512.

The main controller 450 may be called a first controller, which is placed outside the refrigerator, and the auxiliary controller 500 may be a controller that is placed inside the refrigerator to partially receive the control of the first controller to operate and thus be called a second controller.

Current supplied by direct current (DC) lines 513 and 514 may be directly applied to the components of the driver and the driving of the auxiliary controller and be provided in the energy supply form in which an additional rectifier or a transformer is not required. Thus, in this case, since the number of heat generation devices such as the rectifier or the transformer is reduced, energy consumption efficiency of the refrigerator may be improved.

The main controller 450 and the auxiliary controller 500 may be connected to each other through a process in which control signals of the signal lines 511 and 512 are digitally processed through signal transmitting/receiving unit 501.

Each of the AC lines 515 and 516, the DC lines 513 and 514, and the signal lines 511 and 512 may be provided as two lines for a smooth current flow. However, this embodiment is not limited thereto. For example, the lines may be provided as a single line or three or more lines within the scope understood by the technical ideas. For example, the signal lines 511 and 512 may be applied to a single line in some cases for time division and other ways for the reception and transmission. However, in order to apply commercial serial communication, two lines may be applied. The AC line and the DC line may supply three-phase energy.

The AC lines 515 and 516 are provided for driving the heat generation part 601 irrespective of the number of lines, the DC lines 515 and 516 for direct use to the driver 600 and the auxiliary controller are provided, and signal lines 511 and 512 for transmitting and receiving control signals to the driver 600 and the auxiliary controller 500 may be provided.

As the most general and universal application is preferable, the two lines may be provided for each of the AC line, the DC line, and the signal line. Thus, six lines may be inserted into the refrigerator from the main controller 450 within the refrigerator.

It may be seen that the number of lines 511 to 516 is drastically reduced compared to the case in about 40 lines are conventionally introduced into the refrigerator. In this case, there is an advantage that a size of the through-part passing through the vacuum adiabatic body is reduced, and the number of through-parts is reduced. Thus, the energy consumption efficiency of the refrigerator may be improved, and the adiabatic efficiency of the vacuum adiabatic body may be improved.

Here, since all of the six lines are led in the refrigerator through the single pipeline 64, it is advantageous that the adiabatic efficiency is improved, and the manufacturing convenience is further improved.

The six lines may be guided into the refrigerator through a path through which the electric lines 402 and 403 pass, as shown in FIG. 27 and the like. In detail, the six lines may be guided into the refrigerator through the gap between the vacuum adiabatic body and the sealing frame 200.

In this case, the two DC lines 513 and 514 and the two signal lines 511 and 512 provided as the connection lines for connecting the main controller and the auxiliary controller may be divided into three cases in terms of geometric position. Particularly, the lines may be divided into a first connection line disposed in a first space, a second connection line disposed in a second space, and a third connection line passing from the first space to the second space.

Here, in the case of the third connection line, in order to electrically connect the first space to the second space without passing through the vacuum adiabatic body, the third connection line may be disposed to pass through the gap between the main body-side vacuum adiabatic body and the door, i.e., pass between the third space and the door. For example, a path shown in FIG. 27 may be exemplified.

Here, since all of the six lines are led in the refrigerator through the single path, it is advantageous that the adiabatic efficiency is improved, and the manufacturing convenience is further improved.

Alternatively, the six lines may be guided through the pipeline 64 shown in FIG. 2 into the refrigerator. Of course, this embodiment is not limited to these two methods, various other methods may be further included.

Among the six lines, the AC line and the DC line occupying four lines may be power lines.

Figure 35:
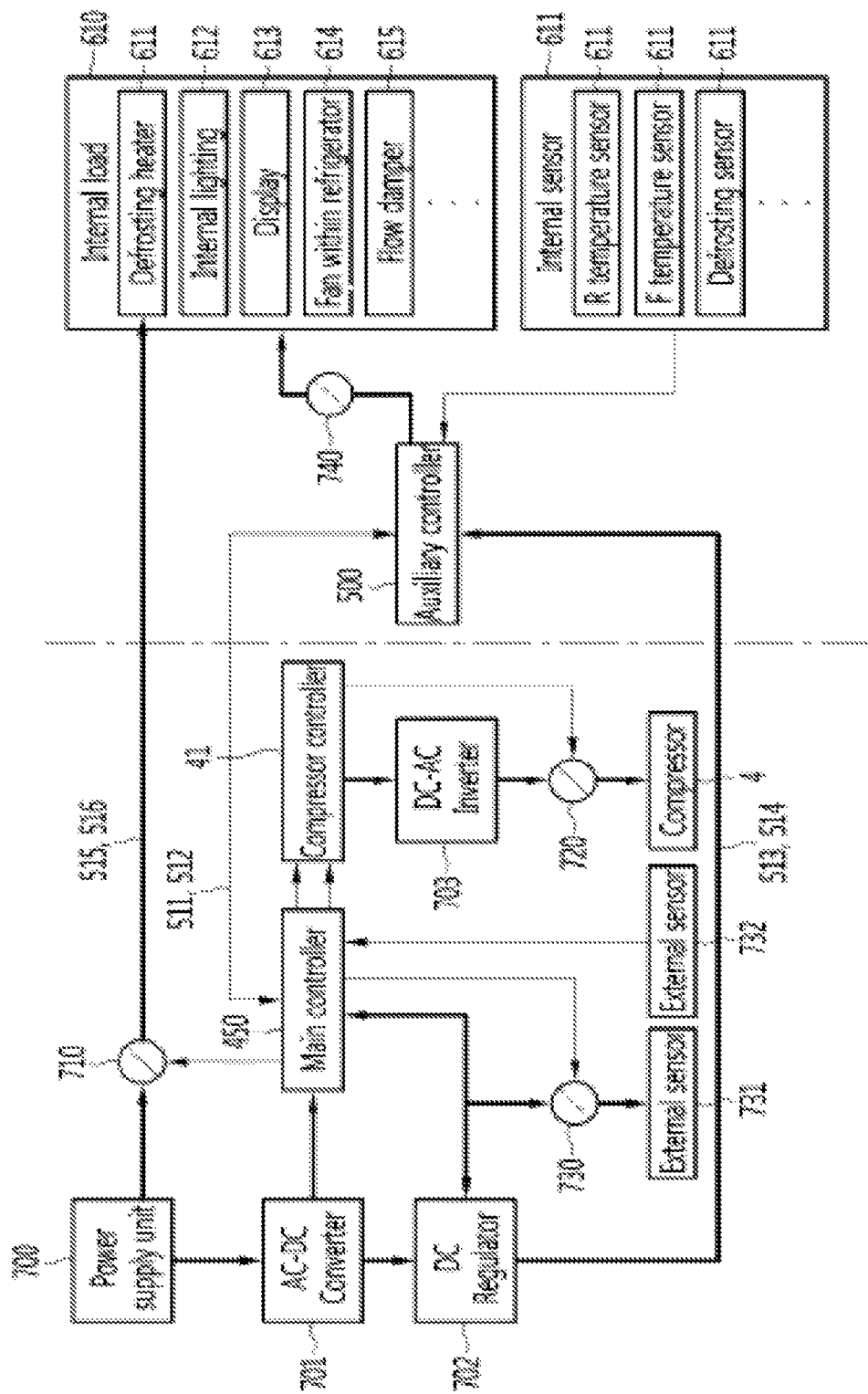
FIG. 35 is a view for explaining an overall control of the refrigerator in detail with respect to six lines.

FIG. 35 is a view for explaining an overall control of the refrigerator in detail together with the six lines.

In FIG. 35, it may be roughly divided into an outer space of the refrigerator at a left side and an inner space at a right side with respect to a one-dot chain line. The main controller 450 is disposed outside the refrigerator, and the auxiliary controller 500 is disposed inside the refrigerator. The main controller 450 may control the entire operation of the refrigerator, and the auxiliary controller 500 may control various devices such as a load and a sensor in the refrigerator.

As described above, the two AC lines 515 and 516, the two DC lines 513 and 514, and the two signal lines 511 and 512 may be provided from the outside to the inside of the refrigerator, through the vacuum adiabatic body, or led into the refrigerator by turning around the outside of the vacuum adiabatic body.

The power connection shown by a bold arrow will be mainly described.

The power supplied from the outside of the power controller 700 may be controlled and supplied in a form that is necessary for the operation of the refrigerator. AC power output from a power supply unit 700 is controlled by a first analog switch 710 and may be supplied to a heat generation part 601 through the AC lines 515 and 516. The heat generation part 601 may include a defrosting heater 611. The first analog switch 710 may be controlled by the main controller 450. The first analog switch 710 may be a relay switch to which a solenoid is applied. The first analog switch 710 is a device for interrupting a large amount of electricity in an analog manner, and it is preferable that the first analog switch 710 is located outside the refrigerator as shown in the drawings because a large amount of heat is generated.

The power supplied from the power control unit 700 may be converted to DC in an AC-DC converter 701 and supplied to the main controller 450. The DC power is rectified by a DC rectifier 702 and supplied to the main controller 450. The DC power rectified by the DC rectifier 702 is supplied to a place, at which the DC power is required, under the control of the main controller 450. The AC-DC converter 701 and the DC rectifier 702 may be disposed outside the refrigerator as the heat generation components in which the switching operation is repeated. The main controller 450 controls the power supplied from the outside of the refrigerator as a whole.

The power supplied from the DC rectifier 702 may be controlled by the first digital switch 730 and supplied to an external load 731 outside the refrigerator. The external load 731 may correspond to a user display and various other control devices.

The main controller 450 may supply the DC power to a compressor controller 41. The compressor controller 41 may generate AC power using the DC-AC inverter 703 and a second analog switch 720 and operate the compressor 4 using a switching action of the compressor 4. The second analog switch 720 may be similar in operation to the first analog switch 710. This is because a large amount of energy is supplied to the compressor 4 and the heat generation part 601.

The DC-AC inverter 703 and the second analog switch 720 may be disposed outside the refrigerator as heat generation components that involve a switching operation and a physical operation.

The DC power supplied from the DC rectifier 702 is supplied to the auxiliary controller 500 through the DC lines 513 and 514. The auxiliary controller 500 may supply the DC power to the internal load 610 within the refrigerator in the state of being controlled using the second digital switch 740. Since the digital switches 730 and 740 operate in a digital manner using software using a chip, little heat is generated. Thus, the second digital switch 740 may not be a factor for lowering the adiabatic effect even if it is placed in refrigerator.

The defrosting heater 611 constituting a portion of the heat generating part 601 among the internal loads 610 may be supplied with energy through the AC lines 515 and 516 as components requiring high energy as described above.

It focuses on signal connection provided by a thin line.

The main controller 450 may control the power supplied to the external load 731 using the first digital switch 730.

The main controller 450 may be connected to the auxiliary controller 500 by the signal lines 511 and 512 so that a sensing signal and a control signal are transmitted and received between the main controller 450 and the auxiliary controller 500. Here, since a separate pre-defined signaling scheme is performed between the two controllers, limitations such as crosstalk or transmission failure may not occur.

The main controller 450 may receive the signal from the external sensor 732 to utilize the signal as information that is necessary for operation of the refrigerator.

The main controller 450 may adjust an operation frequency of the compressor by using the compressor controller 41 according to a load status of the refrigerator and the user's request status. For this, the main controller 450 may transmit a control signal to the compressor controller 41 and the compressor controller 41 to not only adjust the frequency by using the DC-AC inverter but also interrupt a driving signal by using the second analog switch 720.

The control signal transmitted from the main controller 450 to the sub controller 500 may be used as an operation control of the internal load 610 by the auxiliary controller 500 controlling the second digital switch 740.

The second digital switch 740 may control a plurality of loads and control an independent single load. The second digital switch 740 is illustrated as one in the drawing, but a plurality of second digital switches may be provided for each load.

The auxiliary controller 500 may receive various information measured by the internal sensor 620, perform an operation through determination in itself, and transmit the information to the main controller 450 when help of the main controller 450 is required.

The internal load 610 may include a number of components necessary for operation of the refrigerator. For example, the internal load 610 may include components such as an internal lighting 612, a display 613, a fan 614 within the refrigerator, and a flow damper 615.

The internal sensor 620 may include a number of configurations for determining the control status of the refrigerator. For example, the internal sensor 620 may include a refrigerating compartment temperature sensor 621, a freezing compartment temperature sensor 622, and a defrosting sensor 623

As illustrated in FIGS. 34 and 35, according to the embodiment, the number of electric lines connecting the inside and the outside of the refrigerator may be optimized as the AC line, the DC line, and the signal line so as to reduce the size of the through-part and the number of through-parts of the vacuum adiabatic body, thereby leading to an stable operation of the refrigerator.

A rectifier, a switching member, or the like, which generates heat at the time of operation of the refrigerator, is located outside the refrigerator to remove the heat source in the refrigerator. Therefore, energy consumption efficiency of the refrigerator may be improved.

The lines required for the control of the refrigerator may be connected to each other by direct connection between the main controller 450 and the auxiliary controller 500. The auxiliary controller 500, the load, and the sensor may also be directly connected. Thus, stability of signal transmission/reception between the controllers or between the controller and the load may be secured so that the refrigerator operates stably.

A commercial load and a sensor using a DC power source as a driving source or a DC signal as a control signal may be applied as it is to the refrigerator to which the vacuum adiabatic body is applied. Therefore, manufacturing cost of the refrigerator to which the vacuum adiabatic body is applied may be reduced.

Figure 36:
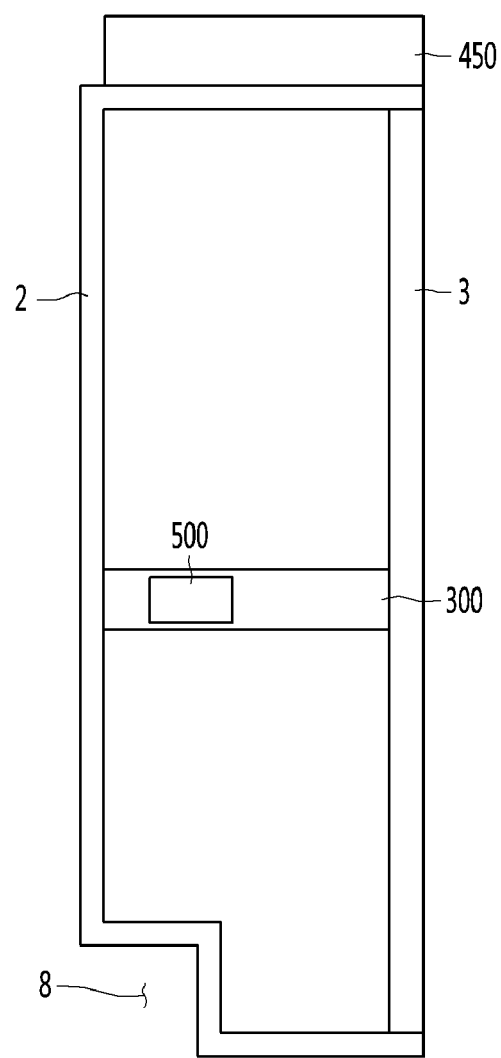
FIG. 36 is a view illustrating installed positions of a main controller and an auxiliary controller.

FIG. 36 is a view illustrating installed positions of the main controller and the auxiliary controller. In this case, the refrigerator may be suitably applied in the case of using the vacuum adiabatic body.

Referring to FIG. 36, the main controller 450 may be disposed outside the refrigerator. The main controller 450 may be disposed outside the top surface of the refrigerator. The power controller 700 or the like may be provided at a position at which the main controller 450 is integrally or adjacent to or spaced apart from the main controller 450.

The auxiliary controller 500 may be disposed on a mullion 300 of the refrigerator. As described above, the mullion 300 may be a member for adiabatically dividing the refrigerating compartment and the freezing compartment and may be made of a predetermined adiabatic material.

The auxiliary controller 500 may maintain a state of being insulated from the inside of the refrigerator in the mullion 300 so that the heat generated during the operation of the auxiliary controller 500 does not affect the inside of the refrigerator.

The paths of the lines 511 to 516 connected to the auxiliary controller 500 in the main controller 450 will be briefly described.

First, as illustrated in FIG. 27, the line may be guided through a path through which the electric lines 402 and 403 pass. In detail, the line may connect the inside and the outside of the refrigerator through the gap between the vacuum adiabatic body and the sealing frame 200. In this case, although two electric lines 402 and 403 are illustrated, six lines 511 to 516 may be guided through the path described in detail.

Alternatively, the line may be guided through the pipeline 64 shown in FIG. 2. In detail, the line passes through the pipeline 64 passing through the vacuum adiabatic body to connect the inside and the outside of the refrigerator.

This manner in which the lines 511 to 516 are guided through the gap between the vacuum adiabatic body and the sealing frame 200 has been described in detail with reference to the drawings. The connection relationship between the main controller 450 and the auxiliary controller 500 when the pipeline 64 is provided will be described.

Figure 37:
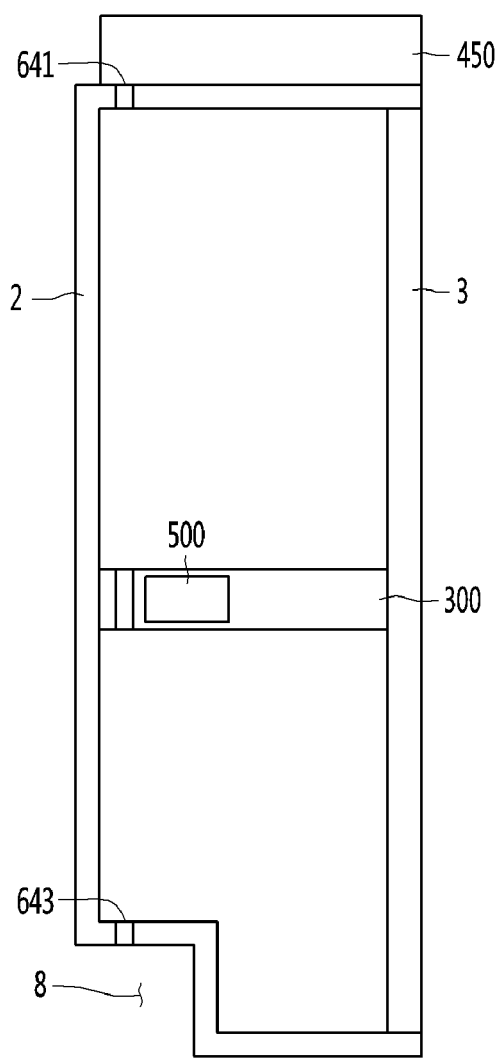
FIG. 37 is a view for explaining connection between the main controller and the auxiliary controller when a pipeline is used.

FIG. 37 is a view for explaining connection between the main controller and the auxiliary controller when the pipeline is used.

Referring to FIG. 37, a first pipeline 641 is provided in the vacuum adiabatic body of the main body 2. The first pipeline 641 may be a member passing through the inside and the outside of the vacuum adiabatic body and be disposed inside the wrinkled conductive resistance sheet 63. In some cases, the pipeline 64 may not be provided, and the wrinkled conductive resistance sheet 63 may serve as the pipeline 64. However, a separate member, which is exemplified by the adiabatic material, may be applied to the pipeline 64 in terms of heat transfer reduction.

Six lines 511 to 516 may pass through the first pipeline 641, and the line may connect the main controller 450 to the auxiliary controller 500. The line passing through the first pipeline 641 and extending into the refrigerator may extend into the inside of the mullion 300 along the inner wall of the vacuum adiabatic body and may be connected to the auxiliary controller 500.

The auxiliary controller 500 may be connected to a plurality of loads and sensors in the refrigerator to control the operation of the refrigerator. Here, the line may extend along the inner surface of the vacuum adiabatic body.

It is preferable that the auxiliary controller 500 is disposed in the mullion 300 to increase the internal space of the refrigerator, to reduce the influence of heat generation, and to maintain a rated temperature for the normal operation of the controller. However, when there is restriction on the installation of the mullion, the auxiliary controller 500 may be positioned in another separate space in the refrigerator, and the mullion 300 may perform only the role of allowing the line to pass therethrough.

A second pipeline 643 may be provided on either side of the vacuum adiabatic body adjacent to the machine room 8. The second pipeline 643 may be used as a pipeline through which the defrosting water is removed to the outside of the refrigerator.

Figure 38:
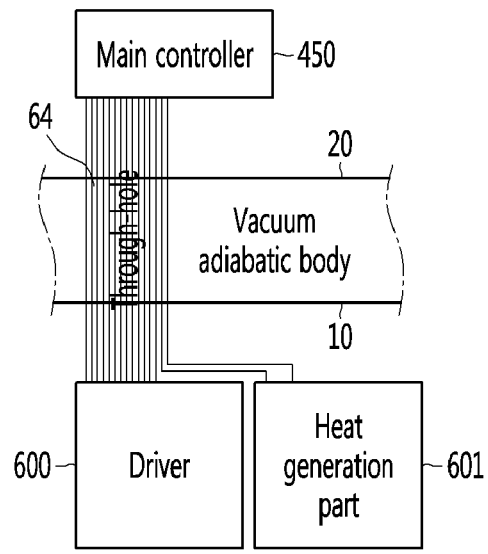
Figure 39:
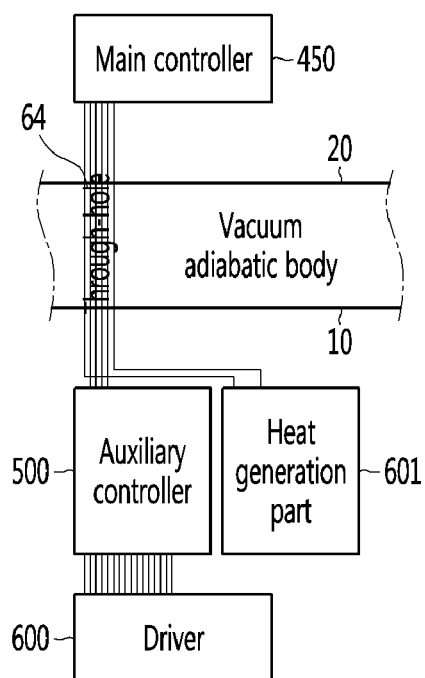
Figure 40:
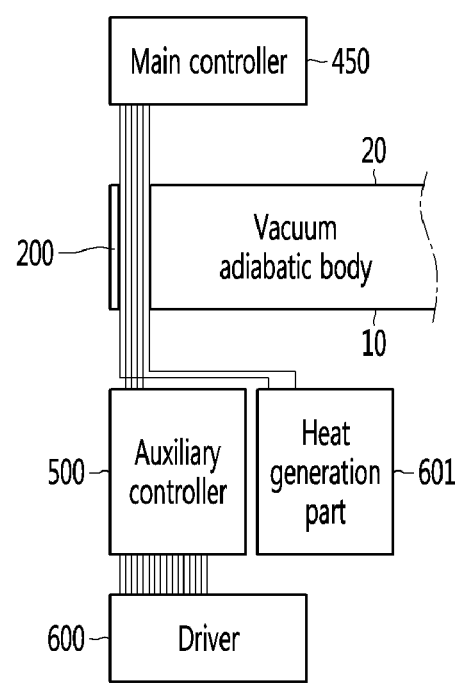

FIGS. 38 to 40 are views for comparing and explaining a configuration of control of the refrigerator, wherein FIG. 38 is a view of a case in which a plurality of lines, e.g., about 40 lines are inserted into the refrigerator in the main controller according to the related art, FIG. 39 is a view of a case in which six lines pass through the pipeline, and FIG. 40 is a view of a case in which the six lines pass through a gap part between the sealing frame and an outer surface of the main body.

First, referring to FIG. 38, although the drawing shows the provision of ten or more lines, this is due to the difficulty of the illustration, and in practice much more lines have to pass through the vacuum adiabatic body. To allow many electric lines to pass through the pipeline 64, the size of the pipeline 64 has to increase, or the number of pipelines 64 has to increase. This is undesirable because it causes deterioration of the adiabatic loss, restriction of refrigerator design, and installation difficulty. Alternatively, even if the gap between the sealing frame 300 and the vacuum adiabatic body is used, it is necessary to provide a wider gap than the sealing frame 300, which results in difficulty in realization of the adiabatic effect. Thus, it is not preferable.

According to the embodiment for solving such a limitation, as described in detail above, it is proposed that only the six lines connect the inside and outside of the refrigerator.

Referring to FIG. 39, the six lines 511 to 516 pass through the pipeline 64. Thus, it is not necessary to enlarge the pipeline 64, and there is no need to increase the number of pipelines. Thus, the adiabatic loss may be reduced, and the design constraint may be eliminated.

Referring to FIG. 40, it is seen that the six lines 511 to 516 pass through the gap between the sealing frame 64 and the outer surface of the main body 2 and are guided into the refrigerator. Thus, it is not necessary to enlarge the gap part, and the six lines 511 to 516 may be provided similarly to the case where the number of electric lines increases by directly using the path in which the electric lines 402 and 403 are provided.

In this case, since the AC lines 515 and 516 connecting the heat generation part 601 are physically large in diameter, and the other lines use a small line, the structure using the electric lines 402 and 403 may be sufficiently utilized.

When the present disclosure is applied, it may be possible to prevent the deterioration in the adiabatic performance of the refrigerator and to facilitate the product design while performing the stable control of the refrigerator to which the vacuum adiabatic body is applied. As a result, the commercialization of the refrigerator to which the vacuum adiabatic body is applied may be promoted.

What is claimed is:

1. A vacuum adiabatic body comprising:
a first plate;
a second plate;
a vacuum space provided between the first plate and the second plate;
a seal configured to seal the first plate and the second plate so as to provide the vacuum space:
electric lines configured to electrically connect a first space adjacent to the first plate and a second space adjacent to the second plate; and
a sealing frame provided in at least an edge of the first plate or an edge of the second plate and configured to shield ends of first and second plates,
wherein the electric lines pass through a single path through the vacuum space, the single path being formed at a gap between the seal and the sealing frame such that the electric lines pass towards the second space from the first space via the gap.

2. The vacuum adiabatic body according to claim 1, wherein the electric lines include:
an alternating current (AC) line through which an alternating current flow;
a direct current (DC) line through which direct current flows; and
a signal line through which a control signal flows.

3. A refrigerator comprising:
a wall provided between a first space configured to store items and a second space, the wall having a first plate and a second plate facing each other to create a third space therebetween, the third space being configured to be in a vacuum state;
a door configured to allow access to the first space;
a first controller provided in the first space and electrically connected a first electric device in the first space;
a second controller provided in the second space and electrically connected a second electric device in the second space;
a first line connecting the first controller and the second controller; and
a second line connected to the second controller and configured to supply current to a component provided in the first space,
wherein at least a portion of the first line and at least a portion of the second line pass through a single path formed at at least one of:
a gap between the third space and the door, or
a pipeline extending through the first plate and the second plate.

4. The refrigerator according to claim 3, wherein the gap is provided between the third space and a sealing frame, the sealing frame being provided at edges of the first plate and the second plate.

5. The refrigerator according to claim 3, wherein the second controller controls the component including a heater, the refrigerator comprises an analog switch configured to connect a power supply to the heater, and the analog switch is provided in the second space.

6. The refrigerator according to claim 3, wherein the first line comprises three or more lines.

7. The refrigerator according to claim 3, wherein the second electric device include at least one of a power supply unit, a first analog switch, a first digital switch, a second analog switch, an AC-DC converter, a DC rectifier, an external load, a compressor controller, or an external sensor.

8. The refrigerator according to claim 3, wherein:
the second controller is a main controller, and the first controller is an auxiliary controller that operates under control of the main controller, and
the first line comprises:
a direct current (DC) line through which the main controller supplies power to the auxiliary controller; and
a signal line through which the main controller controls the auxiliary controller via a control signal.

9. The refrigerator according to claim 8,
wherein the second line comprises an alternating current (AC) line configured to supply AC power to a component in the first space, wherein the AC line passes through a same path as the connection line.

10. The refrigerator according to claim 3,
wherein the first line comprises:
a first connection line provided in the first space;
a second connection line provided in the second space; and
a third connection line electrically connecting the first connection line and the second connection line,
wherein the third connection line passes through the at least one of the gap between the third space and the door, or the pipeline extending through the first plate and the second plate.

11. The refrigerator according to claim 10, wherein the third connection line includes a plurality of third connection lines that pass through the single path.

12. The refrigerator according to claim 10, comprising an adiabatic material inside the first space,
wherein at least one of the first controller and a portion of the first line are positioned in the adiabatic material.

13. The refrigerator according to claim 12, wherein the adiabatic material is included in a partition wall dividing the first space into at least two spaces having different target temperatures.

14. The refrigerator according to claim 12, wherein the first controller is positioned inside the adiabatic material.

15. The refrigerator according to claim 3, wherein the second controller is disposed at a top surface of the refrigerator.

16. The refrigerator according to claim 3, wherein the refrigerator includes five or six wirings, including the first line, connecting the first space and the second space.

17. A refrigerator comprising:
a wall provided between a first space configured to store items and a second space, the wall having a first plate and a second plate facing each other to create a third space therebetween, the third space being configured to be in a vacuum state;
a partition wall provided in the first space and dividing the first space into at least two spaces having different target temperatures, the partition w % all including an adiabatic material:
a door configured to allow access to the first space; and
a first controller provided in the first space and electrically connected to a first electric device provided in the first space,
wherein the first controller is positioned in the adiabatic material to prevent heat generated from the first controller from being transferred to the at least two spaces.

18. The refrigerator according to claim 17,
wherein the first controller is connected to at least two components within the first space by a digital switch including a chip generating little heat.

* * * * *